United States Patent
Fu et al.

(10) Patent No.: US 9,654,678 B1
(45) Date of Patent: *May 16, 2017

(54) INTERNET PROTOCOL SECURITY CAMERA CONNECTED LIGHT BULB/SYSTEM

(71) Applicant: Kuna Systems Corporation, Burlingame, CA (US)

(72) Inventors: Sai-Wai Fu, Los Altos, CA (US); Haomiao Huang, Redwood City, CA (US)

(73) Assignee: Kuna Systems Corporation, Burlingame, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/859,867

(22) Filed: Sep. 21, 2015

Related U.S. Application Data

(63) Continuation of application No. 14/164,540, filed on Jan. 27, 2014, now Pat. No. 9,143,741, which is a continuation-in-part of application No. 13/921,597, filed on Jun. 19, 2013, now Pat. No. 9,172,917, application No. 14/859,867, which is a continuation of application No. 14/205,946, filed on Mar. 12, 2014, now Pat. No. 9,542,832, and a continuation of application No. 14/519,642, filed on Oct. 21, 2014, and a continuation of application No. 14/504,632, (Continued)

(51) Int. Cl.
*H04N 5/232* (2006.01)
*H04N 5/225* (2006.01)
*G06F 3/16* (2006.01)
*H05B 37/02* (2006.01)

(52) U.S. Cl.
CPC ............ *H04N 5/2256* (2013.01); *G06F 3/16* (2013.01); *H04N 5/2254* (2013.01); *H04N 5/23206* (2013.01); *H05B 37/0272* (2013.01)

(58) Field of Classification Search
CPC ............ H04N 5/2256; H04N 5/23206; H04N 5/2254; G06F 3/16; H05B 37/0272
See application file for complete search history.

(56) References Cited

U.S. PATENT DOCUMENTS 5,095,327 A * 3/1992 Boland ................ G03B 11/045
396/534
8,711,216 B2 * 4/2014 Chien ...................... F21S 4/28
348/142

(Continued)

*Primary Examiner* — Gevell Selby
(74) *Attorney, Agent, or Firm* — Christopher P. Maiorana, PC

(57) ABSTRACT

The present invention concerns an apparatus comprising a shade, a camera sensor and a base. The camera sensor may be configured to capture video data of a surrounding environment of the apparatus. The base may be configured to enclose a circuit. The circuit may be configured to provide (i) an electrical connection to (a) the camera sensor and (b) components of the circuit, (ii) a connection between a power source and an external device, and (iii) control signals for activation of (a) the external device and (b) the components of the circuit. The circuit comprises an antenna module configured to connect and send data to a network through a wireless connection. The video data is sent as the data through the wireless connection. The camera sensor is positioned in a bottom part of the base that extends below the shade.

19 Claims, 20 Drawing Sheets

Related U.S. Application Data filed on Oct. 2, 2014, and a continuation of application No. 14/664,275, filed on Mar. 20, 2015.

(60) Provisional application No. 61/790,865, filed on Mar. 15, 2013, provisional application No. 61/783,474, filed on Mar. 14, 2013, provisional application No. 61/684,310, filed on Aug. 17, 2012, provisional application No. 61/923,931, filed on Jan. 6, 2014, provisional application No. 61/783,565, filed on Mar. 14, 2013, provisional application No. 61/902,943, filed on Nov. 12, 2013, provisional application No. 62/166,968, filed on May 27, 2015, provisional application No. 62/197,322, filed on Jul. 27, 2015.

(56) References Cited

U.S. PATENT DOCUMENTS

| | | |
|---|---|---|
| 9,066,393 B2 * | 6/2015 | Recker ............... H05B 33/0815 |
| 2003/0174865 A1 | 9/2003 | Vernon ........................ 382/105 |
| 2003/0197807 A1 * | 10/2003 | Wu ...................... H04N 5/2256 |
| | | 348/375 |
| 2003/0210340 A1 | 11/2003 | Romanowich ................ 348/272 |
| 2004/0207718 A1 | 10/2004 | Boyden et al. ............ 348/14.01 |
| 2005/0152579 A1 * | 7/2005 | Park ................... G06K 9/00369 |
| | | 348/155 |
| 2008/0074256 A1 | 3/2008 | Hirai et al. ................... 340/541 |
| 2009/0015396 A1 | 1/2009 | Yeh et al. ................ 340/538.17 |
| 2010/0141153 A1 | 6/2010 | Recker et al. ................ 315/149 |
| 2012/0120243 A1 | 5/2012 | Chien .......................... 348/159 |
| 2012/0218421 A1 | 8/2012 | Chien ....................... 348/207.1 |

\* cited by examiner

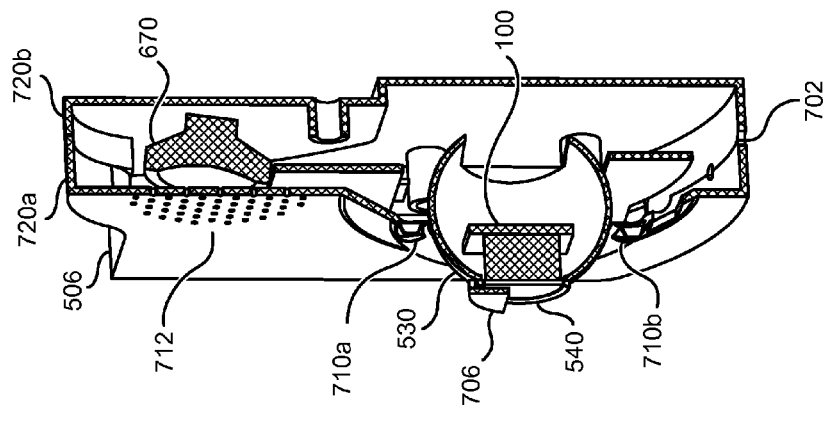
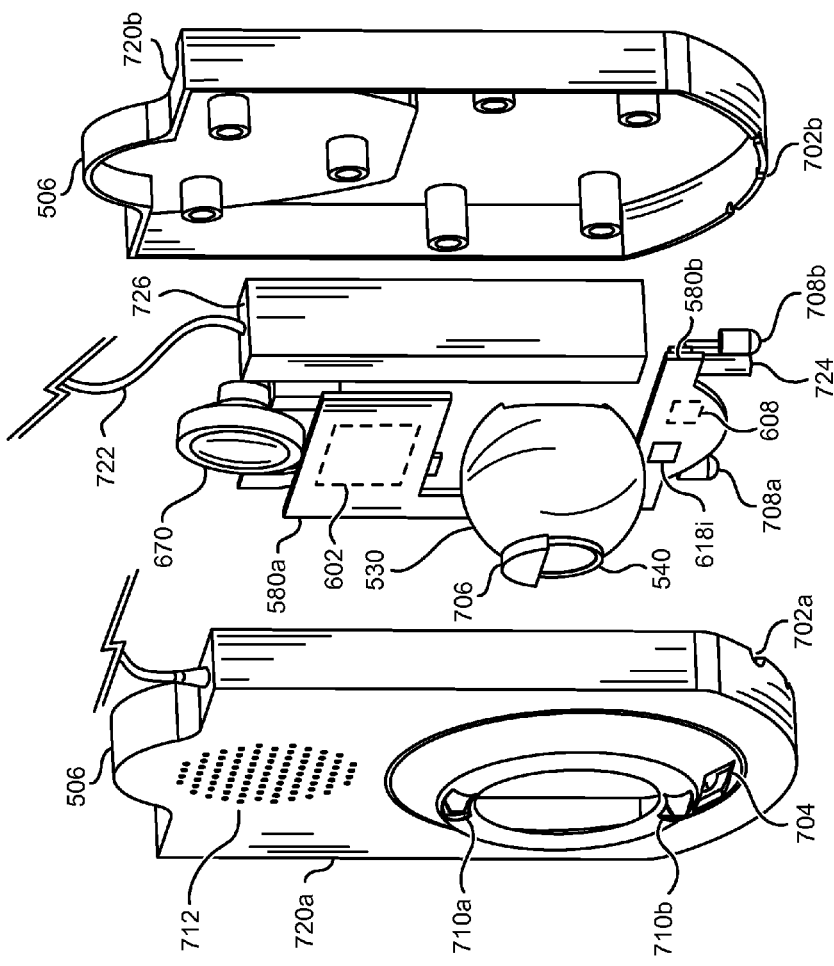
FIG. 30
FIG. 29

INTERNET PROTOCOL SECURITY CAMERA CONNECTED LIGHT BULB/SYSTEM

This application relates to U.S. Ser. No. 14/164,540, filed Jan. 27, 2014, which relates to U.S. Ser. No. 13/921,597, filed Jun. 19, 2013, which relates to (i) U.S. Provisional Application No. 61/790,865, filed Mar. 15, 2013, (ii) U.S. Provisional Application No. 61/783,474, filed Mar. 14, 2013, and (iii) U.S. Provisional Application No. 61/684,310, filed Aug. 17, 2012. U.S. Ser. No. 14/164,540, filed Jan. 27, 2014 also relates to U.S. Provisional Application No. 61/923,931, filed Jan. 6, 2014. This application also relates to U.S. Ser. No. 14/205,946, filed Mar. 12, 2014, which relates to U.S. Provisional Application No. 61/783,565, filed Mar. 14, 2013. This application also relates to U.S. Ser. No. 14/519,642, filed Oct. 21, 2014, which relates to U.S. Provisional Application No. 61/902,943, filed Nov. 12, 2013. This application also relates to U.S. Ser. No. 14/504,632, filed Oct. 2, 2014. This application also relates to U.S. application Ser. No. 14/664,275, filed Mar. 20, 2015. This application also relates to U.S. Provisional Application No. 62/166,968, filed May 27, 2015. This application also relates to U.S. Provisional Application No. 62/197,322, filed Jul. 27, 2015. Each of the mentioned applications are hereby incorporated by reference in their entirety.

FIELD OF THE INVENTION

The present invention relates to security cameras generally and, more particularly, to a method and/or apparatus for implementing an Internet Protocol security camera connected light bulb/system.

BACKGROUND OF THE INVENTION

Conventional light bulbs are passive devices with (at most) simple sensors (light or motion) to help turn the light bulb on or off. Basic Wi-Fi connected light bulbs allow users to control a light bulb from Wi-Fi connected devices. Such systems do not have signals from the light bulb to the users to help the users decide how to control the light bulb. Hence, the control functions would be limited to simple algorithms such as time-based on-off and random on-off timings.

Conventional security cameras need to access an electrical outlet for power. Such systems do not provide any solution if there is no electrical outlet. Often times, especially in an outdoor installation, electrical outlets are not available. Adding a new electrical outlet for a residential home or a small business can cost more in time and money than an average cost of security camera hardware.

Disadvantages with conventional systems are significant. A simple light bulb with one way communication cannot be intelligent. Another disadvantage of conventional security cameras is that they do not provide a solution when there is no power outlet.

It would be desirable to implement an IP (Internet protocol) security camera connected light bulb/system to provide an intelligent light bulb/system with two way communication of sound and/or images that allow imaginative ways of controlling lighting with security features.

SUMMARY OF THE INVENTION

The present invention concerns an apparatus comprising a shade, a camera sensor and a base. The camera sensor may be configured to capture video data of a surrounding environment of the apparatus. The base may be configured to enclose a circuit. The circuit may be configured to provide (i) an electrical connection to (a) the camera sensor and (b) components of the circuit, (ii) a connection between a power source and an external device, and (iii) control signals for activation of (a) the external device and (b) the components of the circuit. The circuit comprises an antenna module configured to connect and send data to a network through a wireless connection. The video data is sent as the data through the wireless connection. The camera sensor is positioned in a bottom part of the base that extends below the shade.

The objects, features and advantages of the present invention include providing a security camera that may (i) receive power from a socket of an outdoor light, (ii) provide a wireless connection to a computer network, (iii) be cost effective to implement and/or (iv) provide intelligent control to a light bulb/system.

BRIEF DESCRIPTION OF THE DRAWINGS

These and other objects, features and advantages of the present invention will be apparent from the following detailed description and the appended claims and drawings in which:

FIG. 29 is a diagram illustrating internal components of an exemplary embodiment of the invention;

FIG. 30 is a diagram illustrating a cut away view of internal components of an exemplary embodiment of the invention;

DETAILED DESCRIPTION OF THE PREFERRED EMBODIMENTS

Figure 1:
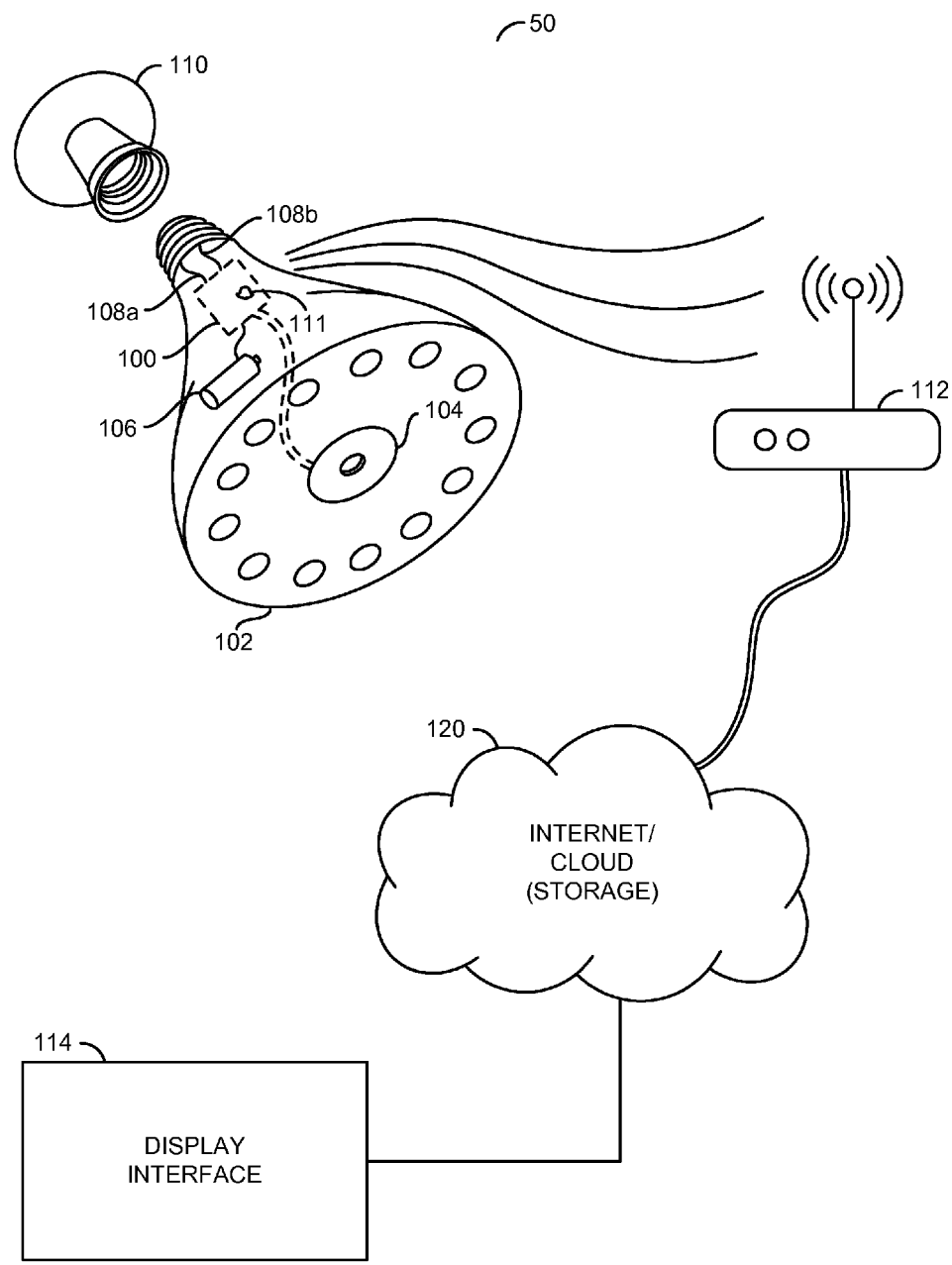
FIG. 1 is a diagram of an example embodiment of the invention.

Referring to FIG. 1, a block diagram of a system 50 is shown in accordance with a preferred embodiment of the present invention. The system 50 generally comprises a camera module and sensor (with or without a lens) 100, a bulb 102, a lens module 104, an optional battery 106 (since DC power is provided from the light bulb), a number of detachable power and/or control wires 108a-108b, a bendable and rigid pipe (to provide structural support of 100 and 104), a light bulb socket for all popular bases 110, an antenna 111, a Wi-Fi adapter/router 112, a phone, tablet, PC, or TV display interface 114, and a cloud storage and/or computation/analytic of images 120. The cloud storage 120 may be the Internet, a local area network, a Network Attached Storage (NAS) device, etc.

Figure 3:
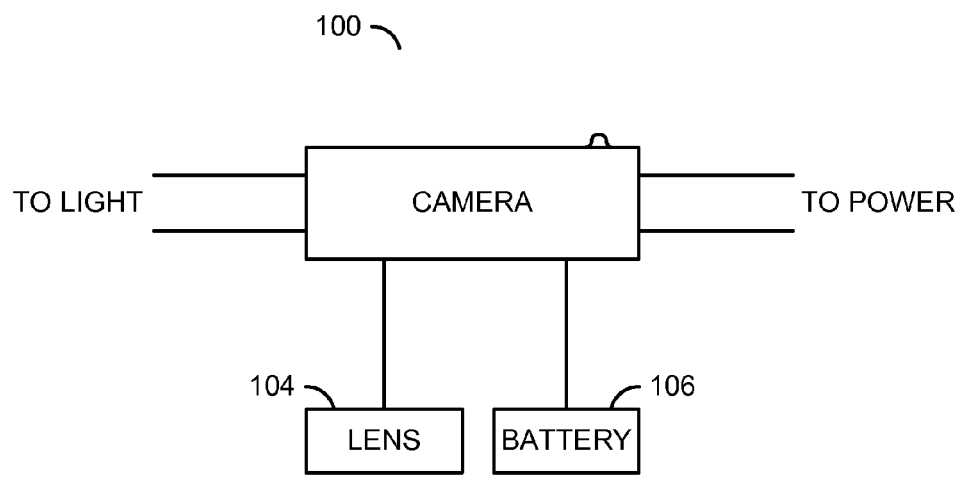
FIG. 3 is a more detailed diagram of the camera module.
Figure 4:
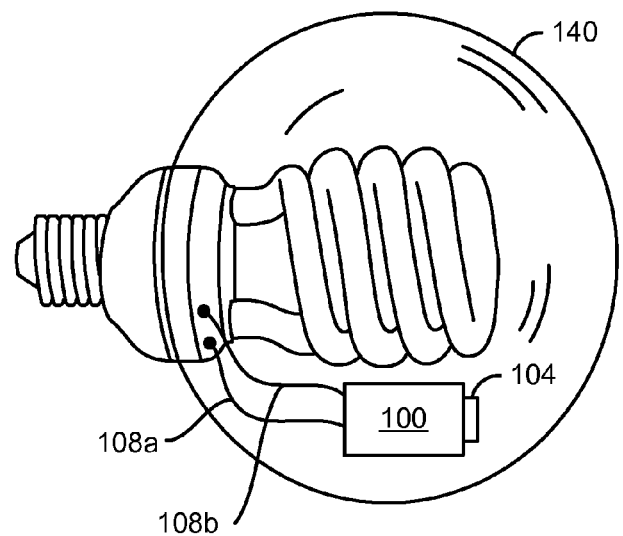
FIG. 4 is an example of the camera module including the housing of a lightbulb.
Figure 5:
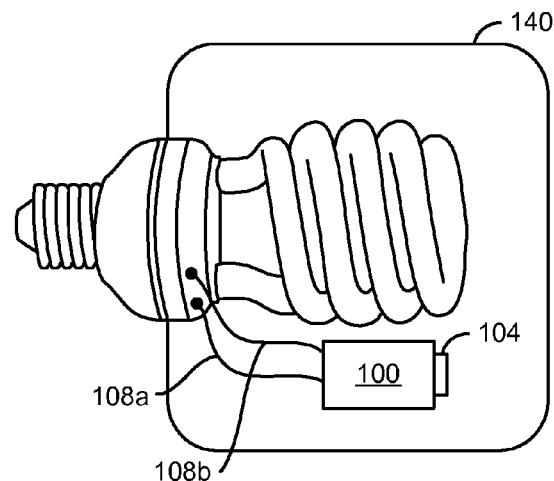
FIG. 5 is an alternate example of the camera module including the housing of a lightbulb.

The connection between the lens sensor 104 and the camera 100 may be implemented as a number of wires (a standard interface for lens module to cell phone circuitry) that may run at high bandwidth, and usually very short distances (FIG. 3). The wires may be implemented in the same chassis as the camera 100. A speaker and/or microphone may be included in the lens 104. The camera 100 and/or lens 104 may be outside of a light shade 140 (FIGS. 4-5) if the shade 140 is opaque.

The camera module 100 may include a complete camera (e.g., without battery and display), but with the video circuitry, the antenna 111, a speaker and/or a microphone. The camera 100 may minimize manufacturing costs by maximizing the amount of circuitry that fits in the camera module 100. The camera 100 may fit in several different mounting configurations (e.g., with and without light bulb integration).

A number of configurations may be implemented (e.g., the circuit 100 being mounted inside the light bulb 102 and/or outside the light bulb 102). In one example, the camera circuit 100 may be mounted inside the light bulb 102 as a small circuit board. Circuitry inside the light bulb 102 may be used to control the intensity and/or color of the bulb 102. The camera circuit 100 may process either still pictures or video or sound captured from the lens 104.

The antenna 111 may be designed to fit inside the camera module 100. The antenna 111 may be implemented as a Wi-Fi antenna. In one example, a GoPro Wi-Fi backpack may be implemented, which is normally about 2 inches wide. In one example, the Wi-Fi frequency may be 2.5 GHz, with ¼ wavelength of around 31 mm (e.g., 1.2 inches). A standard inexpensive omni-directional antenna 111 may be as simple as a wire of a 1.2 inch length and that may fit inside a small (e.g., a 1.5 inch diameter) camera module 100. To optimize the antenna 111 with higher gain, a cable (e.g., more than 3 inches) may be included as the antenna 111.

The control signals from the camera 100 to the light bulb 102 may include ON/OFF, intensity and/or color control. In one example, an array of LED lights may be implemented to provide changes in intensity and/or color. An array may be used to generate specific colors (e.g., white). Other colors may be implemented to meet the design criteria of a particular implementation.

Figure 6:
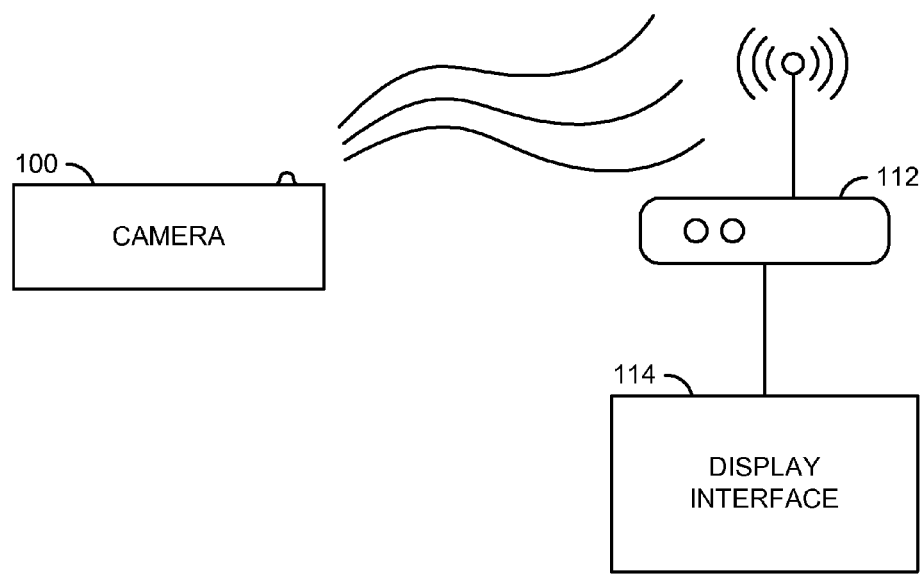
FIG. 6 is a diagram of an alternate implementation of the invention.

In FIG. 6, an example is shown where the camera 100 and the light bulb 102 are controlled by users without going through the cloud 120. A smartphone or tablet application may control the camera 100 and/or the light bulb 102, via Wi-Fi, bluetooth, etc. In one example, a voice command (or hand clapping) may be used to control the camera 100 and/or the light bulb 102 (although not likely for outdoor). In another example, a separate remote control may be implemented (e.g., Wi-Fi, bluetooth, IR, etc.).

The Wi-Fi antenna 111 may be included inside the camera 100, similar to other Wi-Fi connected devices. A very small Wi-Fi connected HD camera module (e.g., with a 1.5 inch diameter and 0.75 inch thickness) may attach to many different sockets/mounts for different uses and/or models. The light fixture 110 is just one of several mounts.

Figure 2:
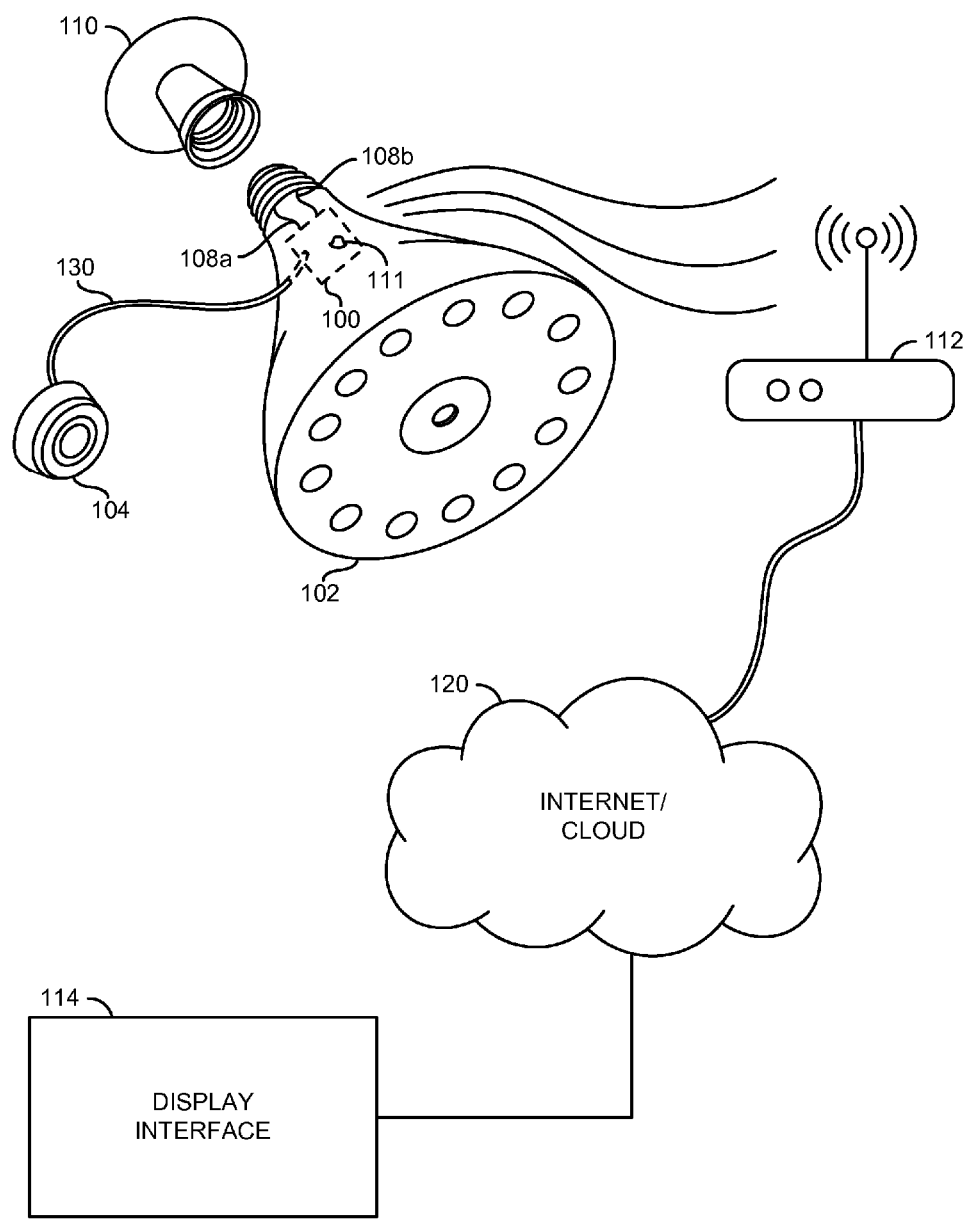
FIG. 2 is an alternate diagram of an example of the invention.

In one example, a cable 130 (see FIG. 2) may range from zero length (stealth, likely in front of the light bulb to avoid glare), to as much as 12 inches (or more) for positioning and/or aiming of the lens 104. The cable 130 may provide power, ground, and a control signal to turn the light bulb 102 on/off and change intensity and/or color. The lens 104 and/or the camera 100 may include all or part of the electronics needed. The particular camera features implemented in the lens 104 and/or the camera module 100 may be varied to meet the design criteria of a particular implementation. The cable 130 should be rigid and/or bendable.

In one example, the socket 110 may have 5 or more cable sockets (e.g., 4 sides and 1 at the front). The cable 130 may be removable from the bulb 102 and/or the camera 100. The cable 130 may be removable such that different lengths may be substituted to meet the design criteria of a particular implementation.

The camera 100 may be configured to take control of one or more of a number of light bulbs connected to a common power switch on the wall. A typical front door of a house usually has one or two light fixtures. Indoor lights often have multiple light bulbs controlled by one wall switch, especially ceiling lights. To control the other light bulbs without a camera, Wi-Fi connected light bulbs may be implemented. The wall switch controlling the receptacle is normally left "on" to power the electronics in the bulbs 102 and/or the camera 100.

The receptacle 110 may be varied to meet the design criteria of a particular implementation. The receptacle 110 may be designed to cover a variety of popular light bulb configurations with different bases (e.g., an A19 is the most popular). The system 50 may operate with LED bulbs and/or Compact Florescent bulbs and/or other types of bulbs (e.g., HID, etc.). The system 50 may operate with a high quality speaker (e.g., a 1.5 inch diameter) and/or a microphone module that may attach to or be integrated to the back of the camera 100.

The system 50 may be used to control an advanced light bulb (e.g., LED, CFL, etc.) by a miniature security camera circuit 100. The control functions may be automated by the signals received by the camera 100, or may be controlled manually by users with access to the images and/or sounds from the camera 100. A variety of Internet connected devices (such smart phones) may be used to control the system 50. The system 50 may provide an immediate benefit of providing electrical power to the camera 100 through the existing light fixture 110 where the light bulb 102 would fit. The additional benefits of controlling a light bulb 102 with images and/or sound from the camera 100 may become important as users learn about the possibilities.

The system 50 may solve several problems by integrating an advanced light bulb 102 (LED, CFC, etc.) with an advanced and/or miniature security camera 100. One problem solved is to provide true intelligence to a light bulb 102 when approached by a person and/or an animal. The light fixture 110 (e.g., in a residential home) is usually placed where strangers and/or animals will likely visit. When a stranger and/or an animal is detected by the security camera 100, an alert may be sent to the home owner. The home owner may instruct the light bulb 102 to operate in a friendly manner (e.g., low intensity and/or rhythmic) or in a hostile manner (e.g., high intensity and/or dissonant). In addition, a microphone and/or speaker of the security camera 100 may allow a home owner to enhance the communication through voice and/or sound. Another problem that the system 50 may solve is that the light fixture 110 can provide power to the security camera through the integrated light bulb. In outdoor residential environment, there is usually no power outlet and/or home-owners generally do not like to run external power cords over the house walls.

In one example, all of the signals from a Wi-Fi connected light bulb and/or an Internet controlled security camera may be controlled by a PC or a web-service in the cloud or a web-based (or portable) computing device. For example, a PC software program may be used to control both the light bulb 102 and/or the security camera 100. In one example, such PC software may include a facial recognition module. Such a facial recognition module may be used to identify and/or sort out friendly people and/or animals from unfriendly people and/or animals. Friendly people may trigger certain sounds, while unfriendly people may trigger other sounds. In one example, an RFID detector module may be included on the camera module 100. Such an RFID detector module may identify whether a particular person is carrying an RFID transmitter that is identifiable by the camera 100. In such a case, an identified person may be presented with familiar lighting sounds. An unidentified person may receive unfriendly sounds (e.g., an alarm, etc.).

In one example, the camera module 100 may include storage for pre-recorded voice messages and/or music for playback that may depend on the particular image/sound/voice input received. For example, unwanted animals (e.g., raccoon, gofer, herons, etc.) may be detected and may be scared away by human voice or other predator voice. Other animals, like hummingbirds and/or squirrels, may be attracted by mating sounds. Another example may be a voice instruction for delivery personnel at front doors. In one example, such pre-recorded messages may be updated from the cloud storage 120 via internet connection. Such images/sounds input may be processed and/or matched with images in the cloud-service and/or analysis may generate appropriate voice messages or music for playback. The latency in response must be minimized and managed. Such messages may be real time (live) from the user watching the image through internet connection. Such voice/music output may be replaced or combined by the algorithm/instruction to control the LED array intensity and/or color of the same light fixture.

The system 50, with the camera module 100, may support conventional landscaping lighting fixtures (e.g., 12 volt DC light bulbs). The circuitry may be simpler if dedicated to a landscaping low voltage DC lighting fixture rather than to a traditional AC voltage. Alternatively, the circuitry may be made to support both traditional AC voltage (120 volt) and/or low voltage DC such as 12 volt.

In outdoor settings when there is no wireless internet network, the system 50 may use the camera 100 to control a light bulb, but may work with "ad hoc Wi-Fi network" supported by the camera and/or a hand-held device, such as a smartphone, tablet, etc. A sample usage model is to install an IP security camera with light bulb control in a place where there is no wireless internet network, and if needed, also install Wi-Fi controlled light bulbs that are connected to the same power switch. A user may then control the camera and the light bulbs with a hand-held device via ad hoc Wi-Fi or bluetooth wireless connection. The camera 100, with instruction from a user, may then proceed to control the light bulb 102 for visitors and/or visiting animals. An image captured by the camera 100 may be downloaded directly to a hand-held device which may later upload to the cloud storage 120. Alternatively, removable storage in the camera (e.g., memory cards) may be removed and inserted into a computer to upload the recorded content to the cloud storage 120.

The system 50 may provide two way communication circuitry in a light bulb, and/or power and/or signals from a light bulb to a miniaturized security camera. Application software may provide intelligence to a light bulb. Innovative placements of the camera 100 with respect to a high intensity light bulb in a closed environment may be used to avoid glare and/or provide optimal lighting to the camera 100.

The system 50 may provide value in the home security camera market. About half of the DIY (Do It Yourself) security camera market does not have an easy way to connect to a power outlet. The system 50 may save home-owners easily $200 in value by simplifying the installation process. The DIY security camera market is about 3 million units per year in the US and is predicted to grow to about 12 million units per year by 2016. With the system 50, about half of such units can save $200 per unit in installation cost, which translates to about $300 M in 2012 and $1.2 B in 2016.

The system 50 may also provide intelligence (e.g., communication, etc.) in the light bulb 102. The system 50 may allow users to communicate to strangers and/or animals in a creative way by combining lighting and/or sound with two-way signals.

Various electronics and/or capabilities may be included in the light fixture 110 adapter instead of in the light bulb 102. The advantage of such an installation is the compatibility with all types of light bulbs (e.g., LED light bulbs, etc.). The adapter 110 may provide a) DC voltage (e.g., 5 volts) for the camera and/or b) wireless communication (e.g., Wi-Fi, RF, etc.) and/or c) dimmer control circuitry.

The camera 100 may integrate various communication channels in hardware and/or software to provide various base-station capabilities of a security monitoring system. For example, Wi-Fi communication to Wi-Fi router may enable communication with the Internet. In another example, an ad-hoc Wi-Fi communication with similar cameras dr monitoring devices may be implemented. RF transceivers (e.g., FM channels around 315 MHz, 433 MHz, etc.) may be implemented to communicate with other monitoring devices such as smoke detectors, water sensors, thermostats, carbon-monoxide detectors, PIR motion detectors, key pads, sirens, etc. Cellular circuitry may be used to communicate with external cell towers. The cellular circuitry may enable communication with central security monitoring services and/or the Internet, as well as a backup channel if the Wi-Fi communication fails. A landline telephone communication channel may be implemented. A landline may enable low cost and/or redundant communication with a central security monitoring service.

Figure 7:
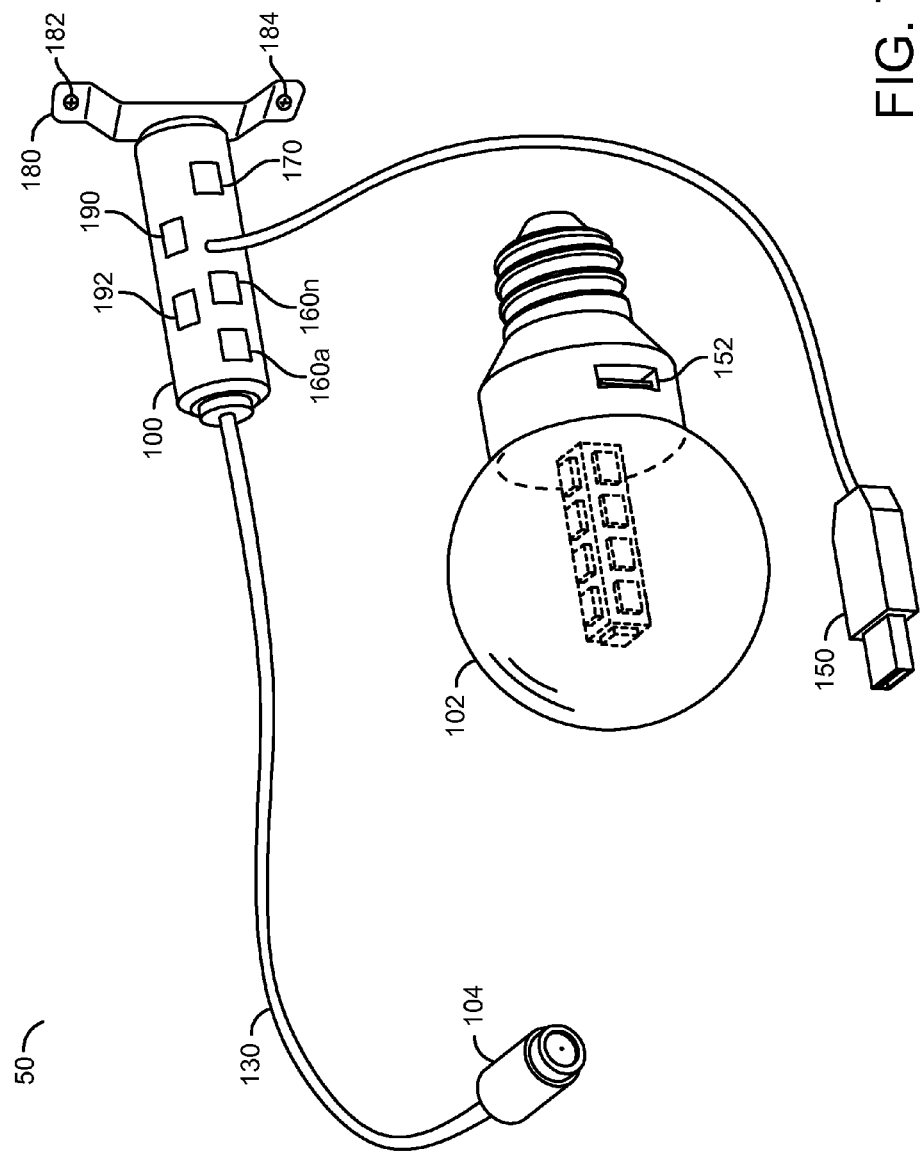
FIG. 7 is a diagram of a distributed implementation.

Referring to FIG. 7, an example of the system 50 in a distributed configuration is shown. The lens-sensor module 104, the processor module 100 and/or audio elements may be separated (or distributed) to make the system 50 smaller and/or more streamlined. The sensor module 104 and/or the processor module 100 may be integrated via a high speed connection such as a micro-coaxial cable. The audio component(s) may be integrated via wireless communication (e.g., RF, etc.). In one example, the processor module 100 may be powered through a connector 150 that may be plugged into a receptacle 152. In one example, the connector 150 and/or the receptacle 152 may be implemented as Universal Serial Bus (USB) connectors. However, other types of general purpose connectors may be implemented.

The system 50 may augment vision with one or more sensors 160a-160n (e.g., IR, PIR, sonar, audio detection, doorbell sound, and/or doorbell signal) to improve the detection of a person. The sensors 160a-160n may be placed in the housing of the processor module 100 along with a speaker 170. Other modules may be placed nearby. The performance of the system 50 may be improved by placing the sensors 160a-160n in positions with better angles and/or by implementing more of the sensors 160a-160n to provide inputs to the processor module 100.

The camera/processor module 100 may include a bracket 180 to attach to a light fixture 110 via a mounting screw connecting the system 50 to the wall mounting fixture. A threaded neck of a security light may be connected to the wall mounting fixture 180. A removable nut at the top of a light fixture 110 may be implemented where the camera module 100 is connected to the light bulb 102 for power and/or control.

The system 50 may control the activation of security deterrence by implementing (i) harsh flashing of the light bulb 102, (ii) a loud siren, (iii) pepper spray, (iv) tear gas, or (v) other deterring actions and/or sounds. In one example, an automatic announcement may be implemented to deter tampering and/or theft of the system 50 by detecting close proximity of a person (e.g., a predetermined range, such as 2 feet, etc.). For example, a sample announcement such as "Do not tamper with this camera. Your pictures have been stored and may be uploaded to the appropriate authority" may be implemented.

In one example, an automatic announcement when a visitor is detected by the system 50 may be made. The announcement may provide time for the homeowner and/or trusted neighbors/friends to answer a phone call placed by the system 50. An example of such an announcement may be, "Hi, how can we help you? We are home but not expecting a visitor at this time."

In one example, the gooseneck camera 130 may be mounted to one of the mounting screws 182 and/or 184 of the light fixture 110. Such wall mounting screws are normally standard in most fixtures in the United States. The sensor module 104 may be mounted in the front. The sensor module 104 may be as small as 0.5 inches in diameter for HD video. For example, an implementation such as an "endoscopy inspection camera" may be used.

The processor module 100 may be located at the mounting end of a housing with the mounting screws 182 and/or 184 by using a micro-coax cable. In one example, the processor module 100 may be stored together with the sensor module 104 in the front in a large housing (e.g., 1.5 inch diameter, etc.). The interconnect to the light bulb 102 may be another wire that runs underneath the cap of the light fixture 110. Another configuration is to attach the processor module 100 at the back of the light fixture 110. If the processor 100 is mounted inside the light fixture 110, the need to separate out a Wi-Fi antenna 190 and/or keep the antenna 190 outside to avoid shielding problems from the light fixture may be minimized.

In one example, a selection of background sounds made by a strong human voice may be mixed in with the voice of the homeowner or trusted neighbors/friends when answering the phone call placed by the camera. Such background voices and/or noises may provide a deterring effect by appearing to a potential intruder that several people are home.

Figure 8:
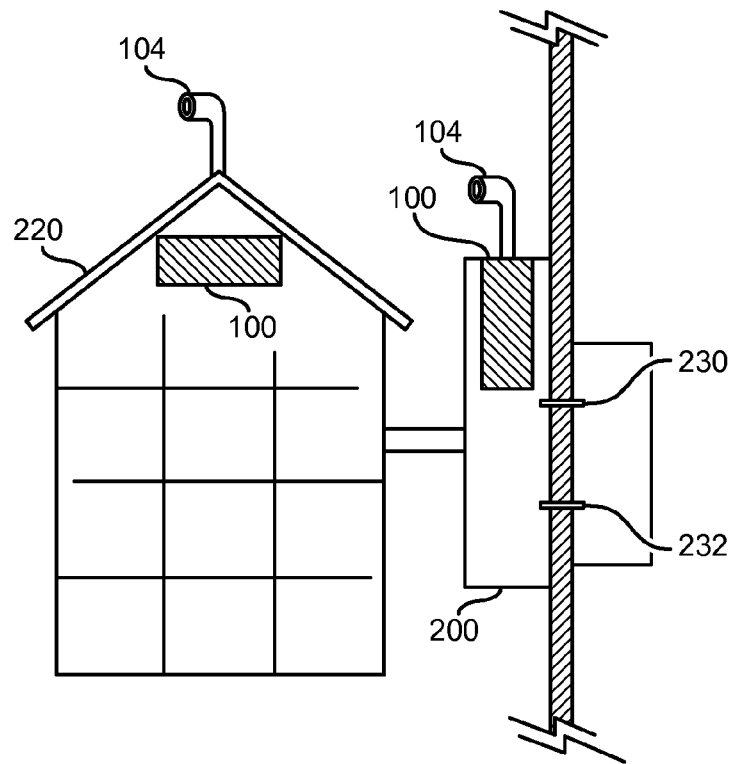
FIG. 8 is a diagram of an example installation.

Referring to FIG. 8, the system 50 is shown with the lens/sensor/processor 100 integrated into the light fixture 110 during manufacturing of the light fixture. FIG. 8 shows two different ways to integrate the apparatus 50 into a light fixture. The first implementation integrates into the light fixture wall mount base. The second implementation integrates inside the light fixture (e.g., on the top or somewhere in the bottom part of the light fixture). The lens/sensor module 100 generally needs some way to pass signals from the enclosure, which may be done with the telescoping gooseneck connection 130 that may support high speed interconnect to the control module 100. A Wi-Fi antenna may also be placed outside the enclosure for optimal range of communication. In addition, the audio speaker and/or microphone may be integrated in the light fixture or as a separate module.

An industrial design of the camera module 100 may be improved using such an integration process. For example, the speaker 170 and/or a microphone 192 may be separated as an option since the light fixture 110 is often mounted too high for two way intercom communication. In one example, two-way voice communication may be connected to the processor module 100 through wireless communication such as RF signals. Such two-way voice intercom may be placed close to a doorbell.

The apparatus 50 may include the camera control module 100, the camera lens/sensor 104, and an audio speaker/microphone intercom. The camera control module 100 may be located in a wall-mounted base 200. In an alternate embodiment, the control module 100 may be located in the roof of a building 220. The camera/lens sensor module 100 may be connected to the control module 100 with a telescopic gooseneck connector, typically through a high speed interconnect. The audio speaker/microphone intercom may be integrated into a light fixture, or may be implemented as a separate intercom module with the wireless communication. The system also includes securing brackets 230 and 232.

Figure 9:
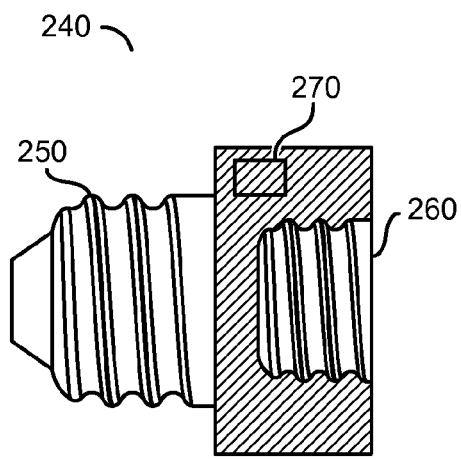
FIG. 9 is a diagram of an adapter.

Referring to FIG. 9, a DC power and control implementation is shown. FIG. 9 shows an adapter 240 that shows one end implemented as a standard A19 screw thread for the standard E26/E27 base socket. The other end is a smaller base, like E10 or E5. The adapter 240 provides a place to mount the electronics, DC power source and/or wireless communication interface. The adapter 240 may be implemented in a compact fashion. The adapter 240 may allow the apparatus 50 to be used with standard light bulbs and to be implemented at a lower cost. The adapter 240 may support E5 to E27, as well as new bases (e.g., a GU24 base, etc.).

A screw end 250 may be compatible with an A19 type standard bulb fixture. A base 260 may be implemented to accept a smaller, more modern type of bulb, such as an E26/E27, or an E10 or E5 type fixture. A cavity 270 may be implemented to store the electronics module 100, a DC low voltage power supply, and/or a wireless communications module, etc.

The audio signal may be wirelessly transmitted to a separate audio intercom. In one example, a speaker and/or a microphone may be optionally powered by a battery. Such a configuration may be desirable to allow optimal placement of an audio communication and video recording and sensing.

Figure 10:
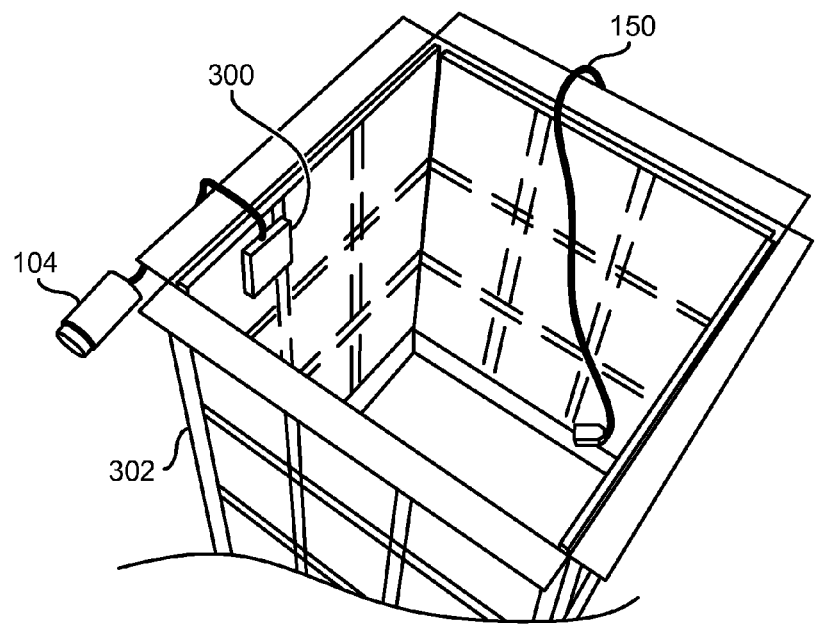
FIG. 10 is a diagram showing an example installation in an outdoor light.
Figure 11:
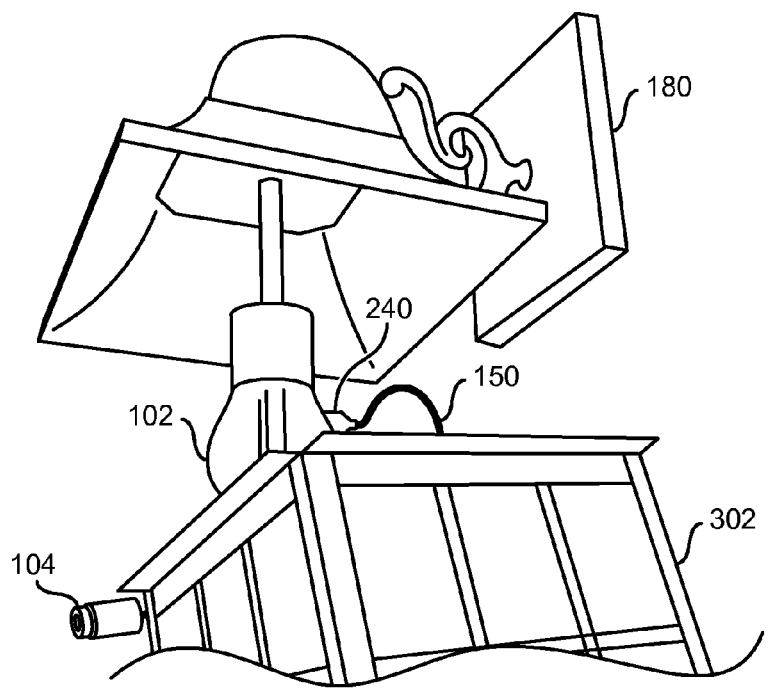
FIG. 11 is a more detailed diagram of the installation of FIG. 10.

Referring to FIGS. 10 and 11, an example mounting of the apparatus 50 in an outdoor light is shown. A connection piece 300 is shown. The connection piece 300 may be implemented, in one example, as an adhesive. In another example, the connection piece 300 may be a hook and loop fastener.

Figure 13:
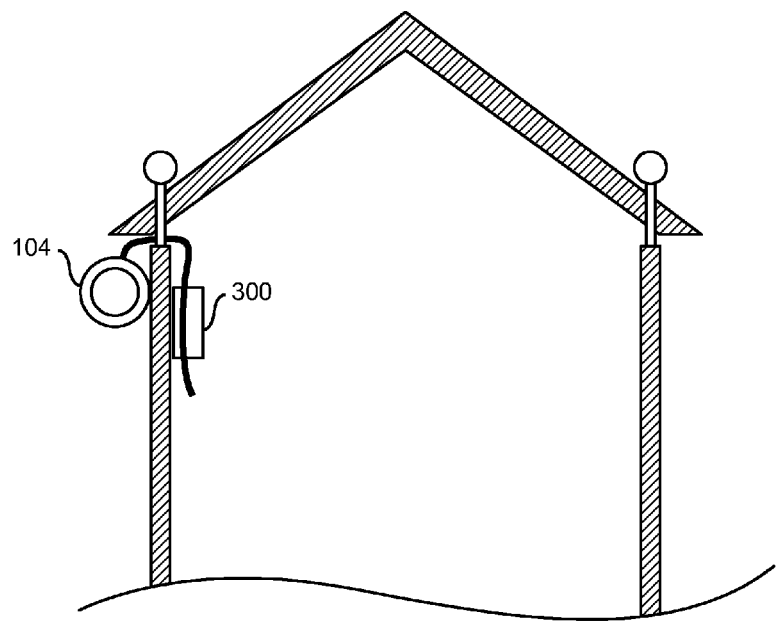
FIG. 13 is a diagram showing an installation on a typical house.

FIGS. 10, 11, and 13 show various novel and effective ways to mount the camera apparatus 50 to an existing outdoor light fixture 302. FIG. 10 shows using a hook and loop fastener 300 to tie the clamp to the side of the light fixture 302. FIG. 11 shows how a power/control connector 150 is inserted into a LED light bulb using an adapter (e.g., as in FIG. 9). A typical implementation of the connector 150 may be implemented as a mini-USB connector. FIG. 13 shows how the hook and loop connectors 300 may be clamped by the lighting fixture 302 to securely mount the camera 100 to the light fixture 302. The clamping action is novel and effective. The light fixture 302 may screw or clamp down the loose ties from the camera apparatus 100.

Figure 12:
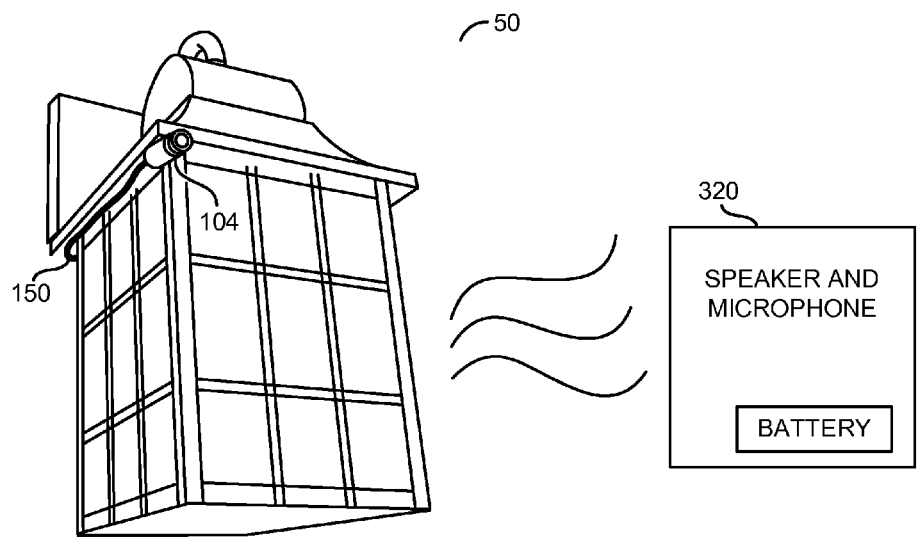
FIG. 12 is a diagram illustrating an outdoor light with the invention installed.

Referring to FIG. 12, a wireless speaker and microphone implementation is shown. A module 320 may wirelessly connect to the module 100. By implementing a wireless module 320 for the intercom, additional placement flexibility may result. FIG. 12 shows a desirable configuration to allow optimal placements of audio communication and video recording/sensing. The example in FIG. 12 shows an indoor video camera configured to look outside of a house through a window (e.g., through the lens sensor 104), and/or wirelessly communicate with a separate outdoor audio intercom powered by batteries. Such an embodiment shows an indoor video and outdoor audio intercom.

Referring to FIG. 13, an alternate installation is shown. A light fixture may screw or clamp down the ties from the camera apparatus by using simple adhesives for easy mounting. For example, the camera module 100 may include a glue tape (e.g., 3M, Scotch, etc.) to attach the light fixture 110 and/or the system 50 to a wall. A connection to the light bulb 102 (or the adapter 240) may be used for power and/or control. The system 50 may be used to control the light bulb 102 in order to eliminate the need for an independent IR light source in the camera during night time by (i) automatically turning on or increasing light intensity of the light bulb 102 when there is insufficient lighting for the camera module 100 to perform, and/or (ii) having an IR light source in the light bulb 102 of the light fixture 110.

The light fixture may screw into a clamp down bracket. A thin tie down may be used to secure a camera. In one example, a velcro-like tie down may be used. Such an implementation is useful when an LED light is integrated into the light fixture 110 and there will be no availability for a replacement of the bulb 102. In addition to the light bulb 102 and/or the light fixture 110, in one example, a separate two-way intercom (speaker and microphone) communicating to the video camera via wireless communication, such as RF or Wi-Fi, may be implemented. Such an implementation may be useful in crime prevention, such as burglaries. The system 50 may be mounted high up under the eaves or with the light fixture, whereas the two-way intercom module may be located at head level and/or near a doorbell.

Figure 14:
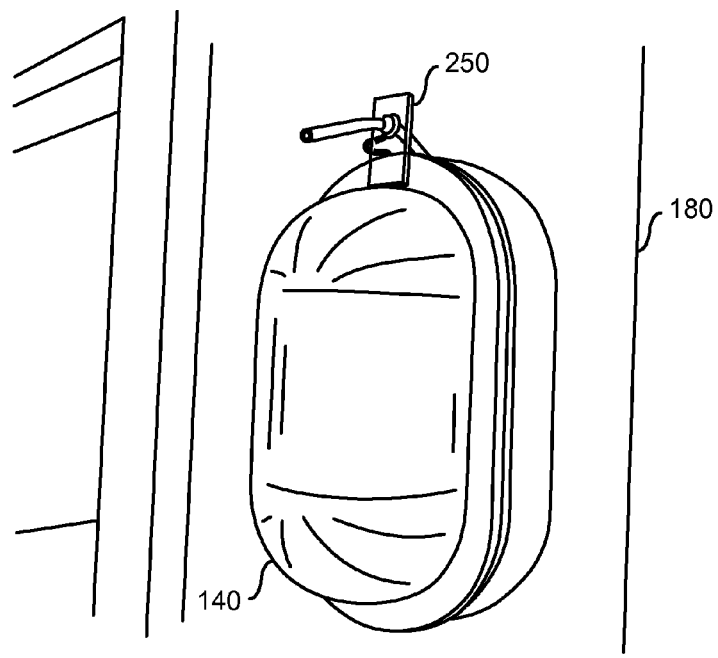
FIG. 14 is a diagram illustrating a side mount installation.

Referring to FIG. 14, a side mount installation is shown. In a flush mounted light fixture, one of the fixture mounting screws may be used to anchor a bracket 250 that may be used to connect the gooseneck camera too.

Figure 15:
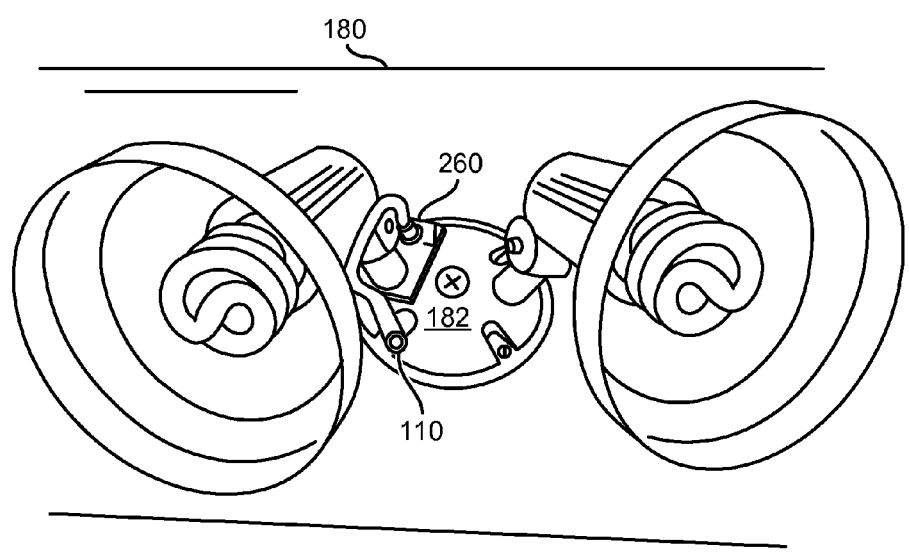
FIG. 15 is a diagram illustrating an installation with a flood light.

Referring to FIG. 15, a flood light type installation is shown. In a spotlight installation, most spotlights have a nut that may be used to position a bracket 260. The bracket 260 may allow positioning of the camera.

Figure 16:
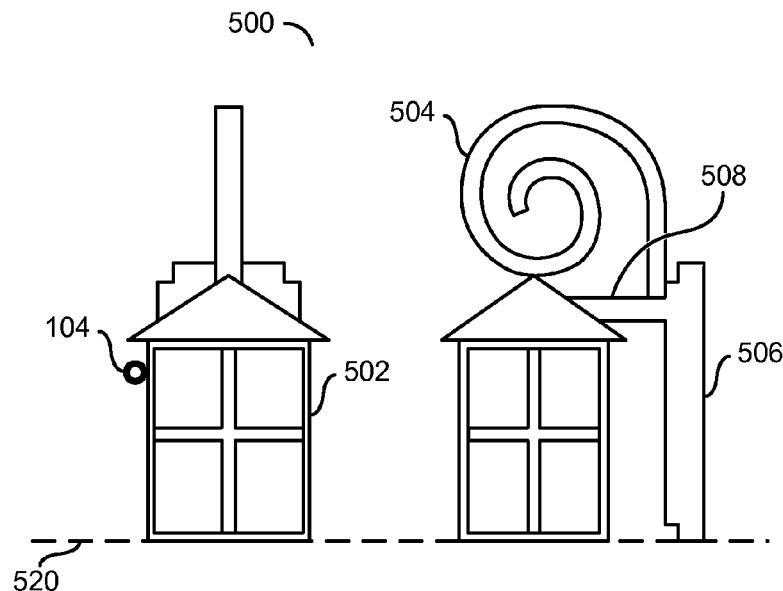
FIG. 16 is a diagram illustrating an installation of an example configuration for a light.
Figure 17:
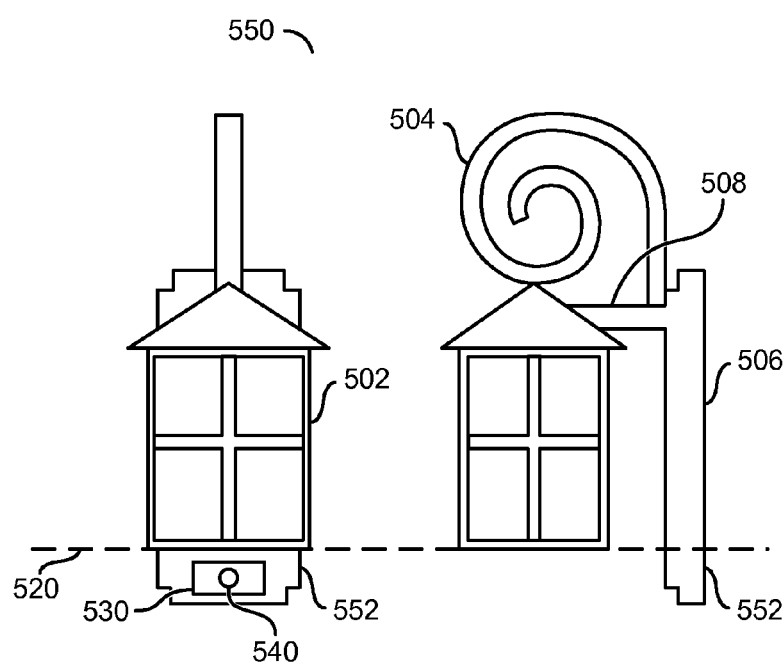
FIG. 17 is a diagram illustrating an installation of a universal fixture base configuration for a light extending below a shade of a light fixture.

Referring to FIGS. 16 and 17, an installation of a universal fixture base is shown. A configuration 500 with a wall-mounted base (similar to the configuration described in FIG. 12) is shown in FIG. 16. The configuration 500 may contain the lens sensor 104 at the top of a light fixture 502. The configuration 500 may have a decorative attachment 504, a housing 506, and an attachment 508. The attachment 504 and/or 508 may provide a physical mount for the light fixture 502. The attachment 508 may connect the housing 506 to the light fixture 502. The attachment 508 may provide a channel to hold electrical wires used to power the configuration 500. The light fixture 502 and the housing 506 are shown generally above a base line 520. A configuration 550 is shown in FIG. 17. The configuration 550 may implement a universal base. The configuration 550 adds a housing extension 552. The housing extension 552 may extend the housing 506 below the base line 520. The housing extension 552 may contain a lens sub-module 530. The module 530 may contain a lens sensor 540. The configuration 550 may provide an improved viewing angle for the lens sensor 540. For example, when compared with the sensor 104, the configuration 550 may eliminate the cable 130 (shown in FIG. 2). For example, a shorter ribbon cable may be used. The sensor 540 and the ribbon cable may be protected from intruders by being enclosed in the housing extension 552 and/or the attachment 508.

Figure 18:
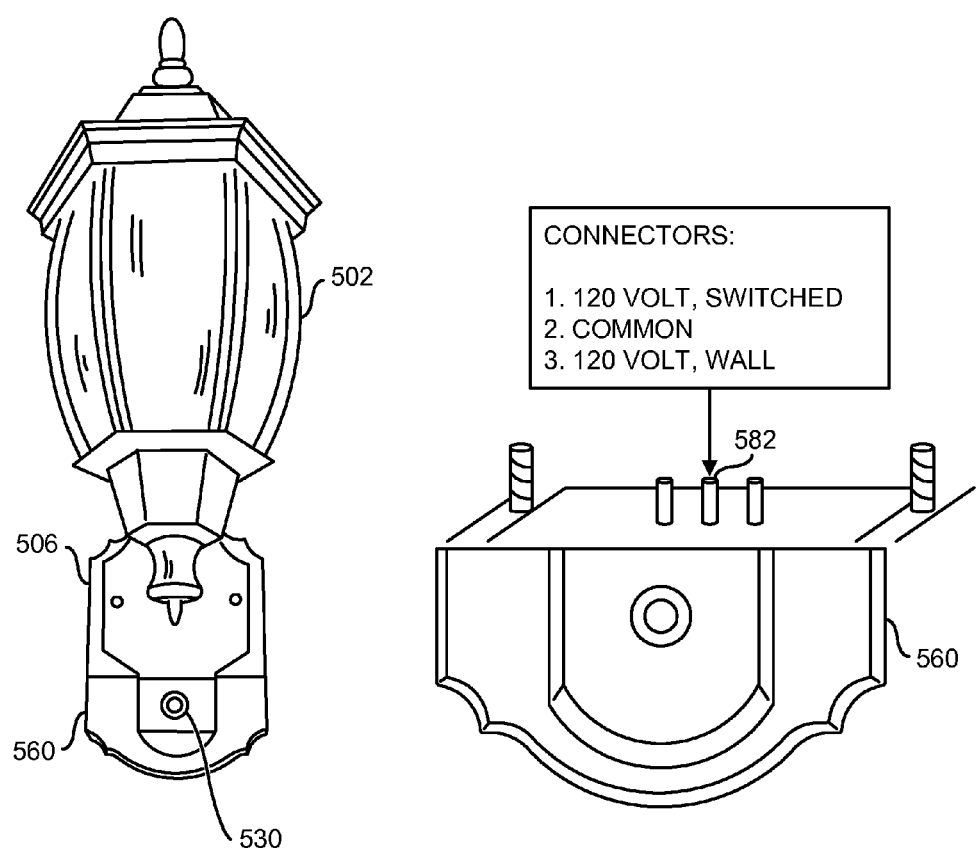
FIG. 18 is a diagram illustrating a modular design of a universal fixture base configuration for a light.

Referring to FIG. 18, a modular design of a universal fixture base configuration is shown. A modular universal base 560 may be connected to the housing 506 and may be connected or disconnected without removing the light fixture 502 and/or the housing 506 from a wall. The modular universal base 560 may contain the lens sub-module 530 and a processor sub-module to be described in more detail in connection with FIG. 19. The lens sub-module 530 is shown attached to the modular universal base 560. However, the sub-module 530 may be separately mounted to allow different viewing angles as desired by the user. The processor sub-module 580 may provide a plug 582 to enable the processor sub-module to control the light bulb 102 (shown in FIG. 1). The plug 582 is shown as a 3-pronged plug that may provide a switched 120V power source to the light fixture 502. Other plug variations may be implemented to meet the design criteria of a particular implementation.

Figure 19:
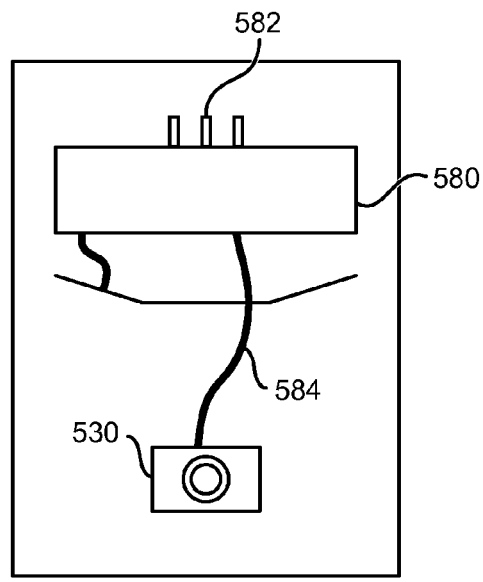
FIG. 19 is a diagram illustrating a processor sub-module connected to a lens sub-module.

Referring to FIG. 19, a processor sub-module 580 connected to a lens sub-module 530 is shown. The processor sub-module 580 and the lens sub-module 530 may be connected with a cable 584. Separating the processor sub-module 580 and the lens sub-module 530 may allow the modules to easily attach to various light fixture styles. The processor sub-module 580 may fit inside the housing 506, the housing extension 552, and/or the modular universal base 560 and connect to the light fixture 502 and/or housing 506 with the plug 582. The processor sub-module 580 may be implemented as a flexible plate and/or may have speakers, a microphone, an antenna, and/or a USB and/or other connector for a PC connection and/or Wi-Fi setup. The processor sub-module 580 may provide a connection for a control signal to the light bulb 102 (shown in FIG. 1). The lens sub-module 530 may be smaller than a common Heath-Zenith PIR sub-modules used in many light fixtures. However, the particular size of the lens sub-module 530 may be varied to meet the design criteria of a particular implementation. The lens sub-module 530 may be pivotable to provide a desired viewing angle.

Figure 20:
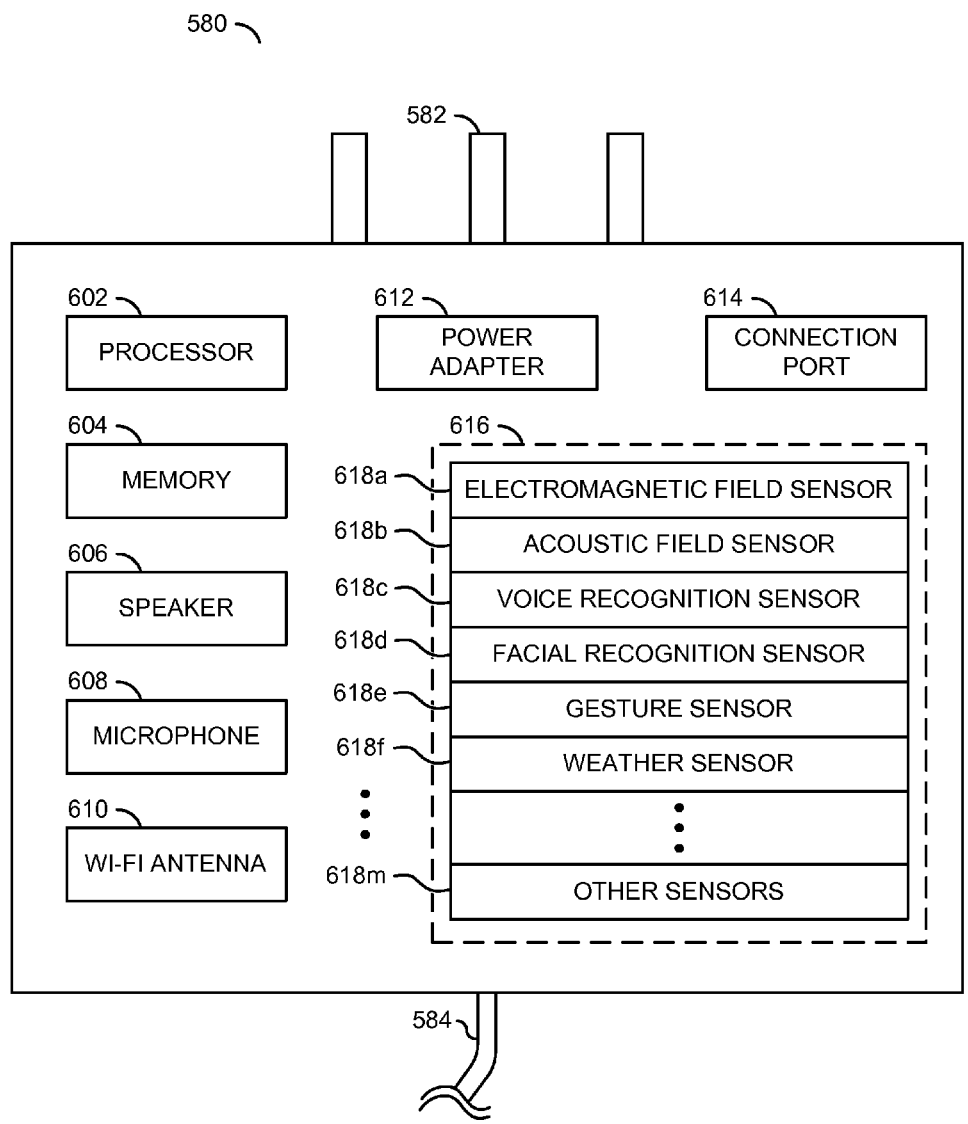
FIG. 20, is a diagram illustrating a processor sub-module.

Referring to FIG. 20, a detailed illustration of the processor sub-module 580 is shown. The processor sub-module 580 generally comprises a block (or circuit) 602, a block (or circuit) 604, a block (or circuit) 606, a block (or circuit) 608, a block (or circuit) 610, a block (or circuit) 612, a block (or circuit) 614, a block (or circuit) 616, and blocks (or circuits) 618a-618m. The circuit 602 may be implemented as a processor. The processor 602 may process input signals and/or generate various control signals. The circuit 604 may be implemented as a memory. The circuit 606 may be implemented as a speaker. The circuit 608 may be implemented as a microphone. The circuit 610 may be implemented as a Wi-Fi antenna. The circuit 612 may be implemented as a power adapter. The circuit 614 may be implemented as a connection port. The circuit 616 may be implemented as a sensor I/O block. The sensor I/O block 616 may include a number of sensor modules 618a-618m.

The memory 604 may store images, audio, and/or other data. Data stored in the memory 604 may be compared to various signals from the sensor modules 618a-618m. In one example, the data stored in the memory 604 may be a password. The processor 602 may compare the password with signals from the sensor modules 618a-618m. The comparison may determine which control signals to generate.

The speaker 606 may generate audio signals. The speaker 606 may be implemented as one or more speakers. In one embodiment, the speaker 606 may be configured to generate a moderate volume sound (e.g., 75 dB at a range of 1 meter). However, the particular volume generated may be varied to meet the design criteria of a particular implementation.

In another embodiment, the processor sub-module 580 may be configured to stream audio signals from a mobile device, and/or other device within range of the processor sub-module 580. The Wi-Fi antenna 610 may be configured to communicate with mobile devices, and/or other devices to send and/or receive audio signals. The connection port 614 may be configured to communicate with various devices to send and/or receive audio signals. The audio signals may be stored in the memory 604. In one example, the speaker 606 may generate audio signals to attract outdoor wildlife and/or chase away undesired wildlife. The lens sub-module 530 may capture images of the wildlife. Images may be stored in the memory 604. An alert may be sent to the user via the Wi-Fi antenna 610, the connection port 614, and/or other methods. In various embodiments, the speaker 606 may or may not be integrated on the board of the processor sub-module 580. For example, the speaker 606 may be separated from the processor sub-module 580 (to be described in more detail in connection with FIG. 22).

The microphone 608 may receive audio signals. Audio signals detected by the microphone 608 may be used by the processor sub-module 580 to generate various control signals. In one example, audio signals generated by a visitor may be received by the microphone 608 to generate a control signal used to control the light bulb 102, and/or control a door (e.g., opening, closing, and/or locking a door). Audio signals detected by the microphone 608 may be used as an audio password. For example, voice recognition may be used to generate a password. The audio password may be needed to allow the processor sub-module 580 to generate various control signals.

The Wi-Fi antenna 610 on the processor sub-module 580 may receive and/or transmit data signals. The Wi-Fi antenna 610 may register electromagnetic signals, acoustic signals, and/or other signals. The Wi-Fi antenna 610 may provide control signals to turn on the light bulb 102, create sound from one or more speakers, send alerts to users, and/or send other wireless signals.

The power adapter 612 may receive electrical power from the light bulb 102 and/or from a wall base 110 of the light fixture box 502. Electrical power from the light bulb 102 may be presented to the processor sub-module 580 by a connection to the plug 582. The power adapter 612 may convert the electrical power. The converted electrical power may provide a power supply to the various components attached to the processor sub-module such as the lens sub-module 530, and the sensors 618a-618m. In one example, the power adapter 612 may be implemented as a 5V power adapter.

The connection port 614 may provide a physical connection to various devices. The connection port 614 may be configured to communicate with various devices. In one example, the connection port 614 may be a Universal Serial Bus (USB) port. However, the particular type of port may be varied to meet the design criteria of a particular implementation. The connection port 614 may be configured to connect to an external device such as a computer and/or mobile device. The configuration port 614 may be configured to allow the user to have access to a Wi-Fi setup for the Wi-Fi antenna 610, store data (e.g., audio files) in the memory 604, configure the sensor modules 618a-618m, and/or update firmware. The firmware may be stored on the memory 604. The firmware may store instructions that, when executed by the processor 602, implement one or more steps and/or control actions.

The sensor modules 618a-618m may be implemented as environmental sensors. The sensor module 618a may be an electromagnetic field sensor. The sensor module 618b may be an acoustic field sensor. The sensor 618c module may be a voice recognition sensor. The sensor module 618d may be a facial recognition sensor. The sensor module 618e may be a gesture sensor. The sensor module 618f may be a weather sensor. The sensor I/O block 616 may include other sensors, such as a smart IP camera and/or a PIR motion detector to detect people and/or animals. The particular number and type of sensor modules 618a-618m may be varied to meet the design criteria of a particular implementation. The sensor modules 618a-618m may be interchangeable. One or more of the sensor modules 618a-618n, or a combination of the sensors modules 618a-618m may be implemented internally as part of the processor sub-module (e.g., within a housing 506), or alternatively may be implemented externally (e.g., as a separate sensing device coupled to the processor sub-module 580). Input received by the sensor modules 618a-618m may be interpreted by the processor 602. For example, input received by the sensor modules 618a-618m may be used to generate control signals. In one example, a control signal may be sent to the power adapter 612 to control the light bulb 102. The control signals may also control the intensity, color and/or frequency of the light bulb 102.

In one example, the electromagnetic field sensor 618a may detect electromagnetic fields generated by appliances, other electronics, and/or other sources of electromagnetic fields within the range of the processor sub-module 580. Disturbances in the electromagnetic field may be used by the processor 602 to detect potential visitors and/or other objects.

In one example, the acoustic field sensor 618b may detect acoustic fields generated within the range of the processor sub-module 580. Such disturbances in the acoustic field may be used to detect potential visitors and/or other objects.

In one example, the voice recognition sensor 618c may be configured to recognize audio signals such as voices. The microphone 608 may present audio signals to the voice recognition sensor 618c. Signals detected by the voice recognition sensor 618c may be used by the processor sub-module 580 to generate various control signals. In one example, audio signals and/or a command voice may be needed (e.g., a password) to allow the processor sub-module 580 to generate various control signals.

In one example, the facial recognition sensor 618d may be configured to recognize the facial and/or other features of a person and/or of other objects. Signals detected by the facial recognition sensor 618d may be used by the processor sub-module 580 to generate various control signals. In one example, facial recognition and/or recognition of other features of a person and/or other object may be needed to allow the processor sub-module 580 to generate various control signals.

In one example, the gesture sensor 618e may be configured to recognize gestures and/or movement of a person and/or other object. Signals detected by the gesture sensor 618e may be used by the processor sub-module 580 to generate various control signals. In one example, a particular gesture and/or combination of movements may be needed to allow the processor sub-module 580 to generate various control signals.

In one example, the weather sensor 618f may be configured to detect various weather variables such as temperature, humidity and/or atmospheric pressure. The weather sensor 618f may be comprised of a photodiode. The photodiode may be configured to determine daytime, nighttime, and/or the amount of light in the environment. Signals detected by the weather sensor 618f may be used by the processor sub-module 580 to generate various control signals. In one example, notifications about the weather may be sent to the user. In another example, the amount of light in the environment may be used to control curtains and/or blinds to prevent and/or allow a particular amount of light through a window. In another example, light intensity of the light bulb 102 may be increased as light in the environment decreases. An increase in light intensity of the light bulb 102 may ensure there is sufficient light for the lens sub-module 530 and/or other sensor modules 618a-618m to properly function. Controlling light intensity of the light bulb 102 may eliminate the need for an IR light source in a camera during nighttime operation. The IR light source may be implemented in the light bulb 102.

The lens sub-module 530 is shown connected to the processor sub-module 580 with the cable 584. In various implementations the lens sub-module 530 may be integrated on the processor sub-module as part of the sensor I/O block 616. The lens sub-module 530 may be used to detect potential visitors, and/or other objects. Signals detected by the lens sub-module 530 may be used by the processor sub-module 580 to generate various control signals. In one example, the lens sub-module 530 may detect a visitor. A control signal may be generated to control the light bulb 102 and/or control a door. In another example, the lens sub-module 530 may detect an unwanted visitor. A control signal may be generated to prohibit the unwanted visitor from entering the premises, alert the homeowner, and/or contact proper authorities. The lens sub-module may work in combination with various sensor modules 618a-618m such as the facial recognition sensor 618d and/or the gesture sensor 618e.

Figure 21:
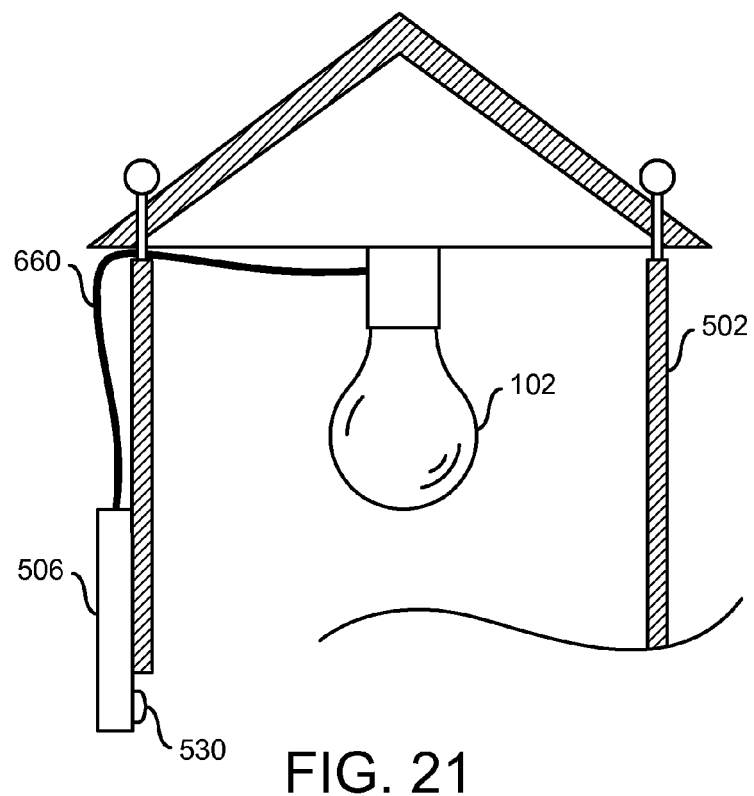
FIG. 21 is a diagram illustrating a processor sub-module and lens sub-module connected to a light fixture.

Referring to FIG. 21, a processor sub-module and lens sub-module connected to a light fixture is shown. The lens sub-module 530 may be mounted on the housing 506. The processor sub-module 580 (shown in FIG. 19) may be mounted in the housing 506. In one example, the processor sub-module 580 may include the speaker 606. The processor sub-module may be connected to the light bulb 102 with a cable 660. In the example shown, the cable 660 is shown exposed. However, the cable 660 may be contained within the attachment 508 (shown in FIGS. 16 and 17). The processor sub-module 580 may get power from the light bulb 102 and/or may provide a control signal to the light bulb 102. The cable 660 may connect to the plug 582 (shown in FIG. 19) on the processor sub-module 580.

Figure 24:
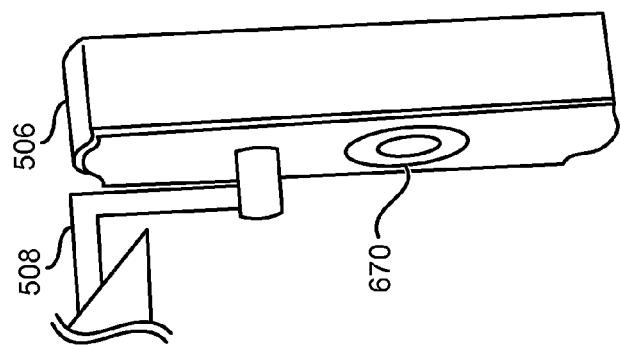
FIG. 24 is a diagram illustrating a side view example of a speaker separated from the processor sub-module.
Figure 23:
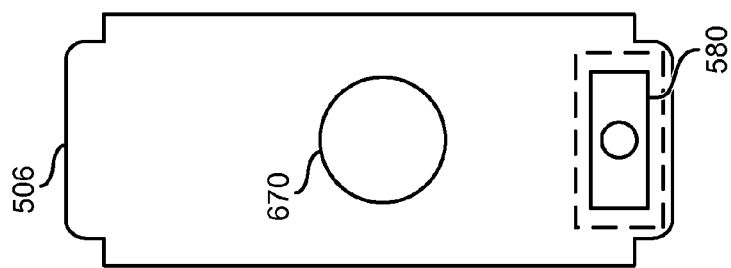
FIG. 23 is a diagram illustrating a front view example of a speaker separated from the processor sub-module.
Figure 22:
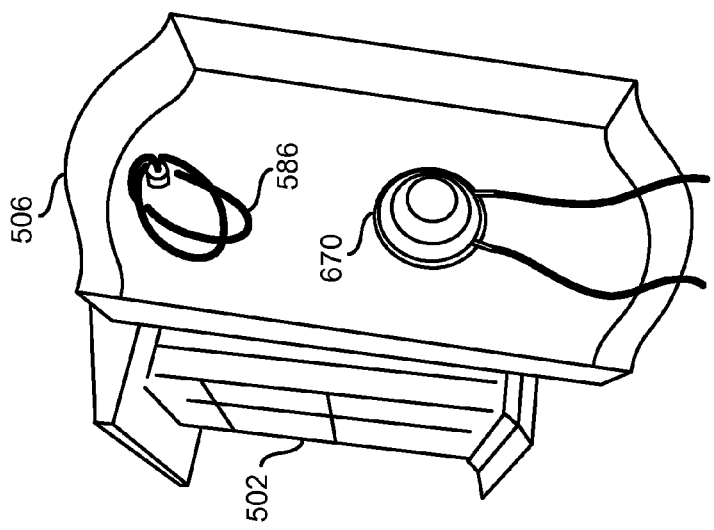
FIG. 22 is a diagram illustrating a rear view example of a speaker separated from the processor sub-module.

Referring to FIGS. 22-24, an example of an external speaker 670 separated from the processor sub-module is shown. The processor sub-module 580 is shown inside the housing 506. The external speaker 670 is shown moved up the housing 506, facing forward. Separating the speaker 606 (shown in FIG. 20) from the processor sub-module 580 allows the external speaker 588 to be positioned as desired by the user.

Figure 25:
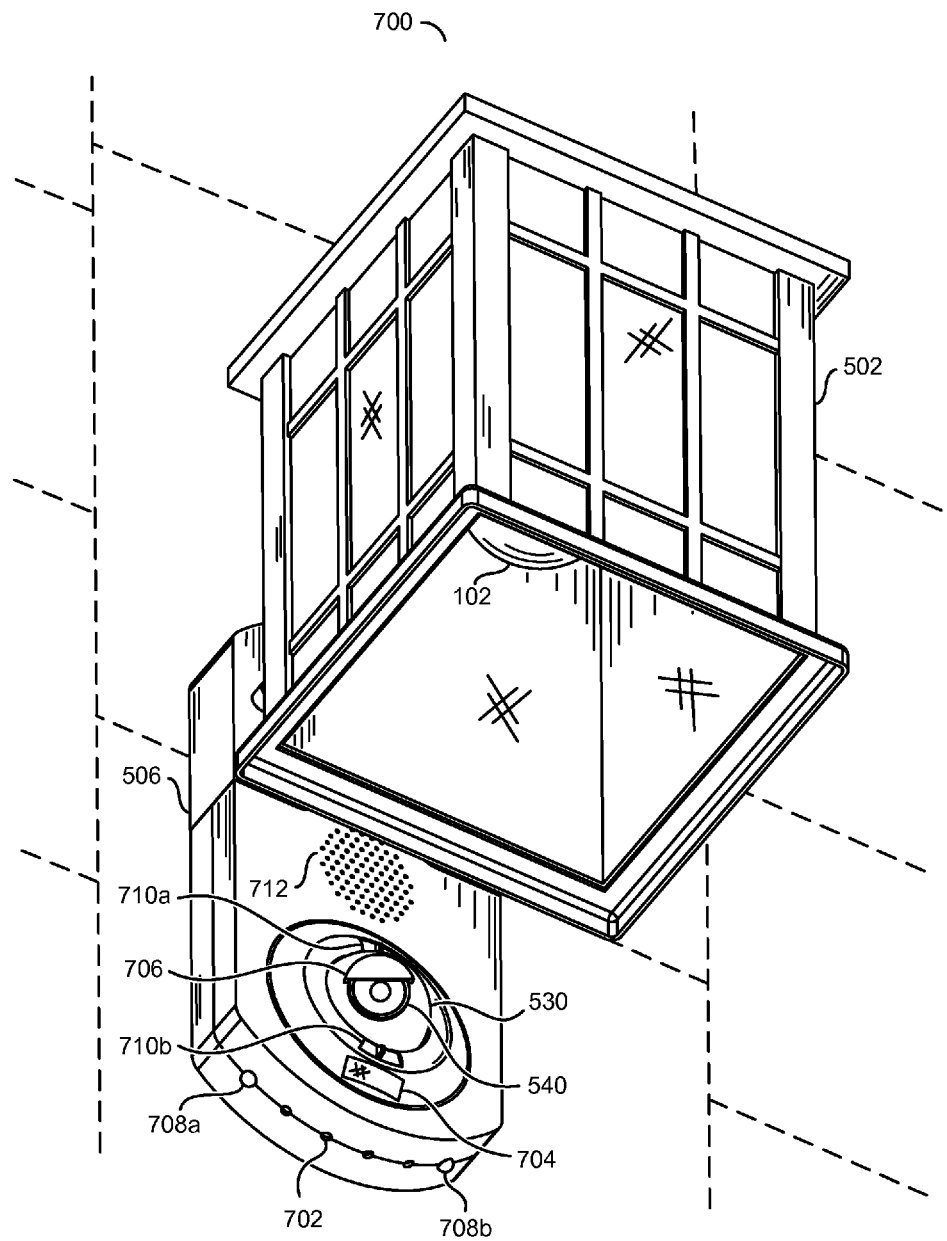
FIG. 25 is a diagram illustrating an exemplary embodiment of the invention.

Referring to FIG. 25, an exemplary embodiment 700 is shown. The exemplary embodiment 700 may comprise the light shade 502 and the base 506. The base 506 may comprise the lens module 530, a microphone grille 702, an IR sensor lens 704, indicator LEDs 708a-708b, adjustment grips 710a-710b and a speaker grille 712. The lens module 530 may comprise the lens 540 and the lens cover 706.

The exemplary embodiment 700 may further optionally comprise the light bulb 102. The light bulb 102 may be replaceable. The light bulb 102 may be implemented using an incandescent light bulb, a compact fluorescent lamp (CFL) bulb and/or an LED bulb. The type and/or style of the light bulb 102 may be varied according to the design criteria of a particular implementation.

The exemplary embodiment 700 may be implemented as a light fixture. The light fixture 700 may be configured to mount to a wall and/or ceiling mount. The light fixture 700 may be configured to connect to existing electrical wiring. For example, the light fixture 700 may be mounted to an electrical box (e.g., a junction box) that provides wiring to the electrical system of a premises.

The light shade 502 may be implemented in various styles. The color, shape and/or material of the light shade 502 may be varied according to the design criteria of a particular implementation. Generally, the light shade 502 may extend downwards to a height above the lens module 530. For example, the light shade 502 may be configured to not block and/or obstruct a view from the lens 540.

The base 506 may be implemented in various styles. The color, shape and/or material of the base 506 may be varied according to the design criteria of a particular implementation. Generally, the color, shape and/or material of the base 506 may be selected to match (or partially match) the color, shape and/or material of the light shade 506. For example, the base 506 may be implemented as a plastic housing. The plastic material used for the base 506 may allow for signal propagation (e.g., Wi-Fi signals, Bluetooth signals, etc.). The base 506 may be implemented having various holes (e.g., portal holes) to provide heat ventilation and/or audio enhancement. The base 506 may be configured as a housing for (e.g., to enclose) one or more components of the light fixture 700. For example, internal components of the light fixture 700 may be fully enclosed within the base 506. In another example, one or more components of the light fixture 700 may be positioned on and/or in (or partially on and/or in) the base 506.

The lens module 530 may be positioned on and/or in the base 506. The lens module 530 may be positioned below a level of the light shade 502. The lens module 530 may be implemented as a spherical and/or an orb shape. The sphere shape of the lens module 530 may allow the lens module 530 to rotate in the base 506. Rotating the lens module 530 may allow the lens module 530 to be directed at various angles to capture video data of the surrounding environment of the light fixture 700. In some embodiments, the lens module 530 may be manually rotated (e.g., rotated by a user). In some embodiments, the lens module 530 may be configured to rotate automatically (e.g., controlled by the processor 602). For example, the lens module 530 may be configured to track various types of objects and/or detected movements.

The lens module 530 may be implemented using a heat-sinking material. In one example, the lens module 530 may be comprised of aluminum. The material used to implement the lens module 530 may be varied according to the design criteria of a particular implementation. For example, the material used may allow the lens module 530 to be waterproof, provide heat dissipation and/or provide glare protection.

The lens module 530 may be configured to capture video data. For example, the lens module 530 implement a 720P HD video camera. The video data may be high-resolution video frames and/or audio data. The quality of the video data may be varied according to the design criteria of a particular implementation. Generally, the quality of the video data is enough to support object detection (e.g., facial recognition, motion detection, object identification, tagging, etc.).

The lens 540 may be configured to receive and/or focus light from the surrounding environment. The light received and/or focused by the lens 540 may be provided to the camera module 100. The lens cover 706 may be configured to cover a top portion of the lens and/or lens module 530. The lens cover 706 may be configured to reduce an amount of glare caused by the light bulb 102.

The microphone grille 702 may be positioned on a lower (or bottom) portion of the base 506. The microphone grille 702 may be implemented as holes on the base 506. For example, the microphone grille 702 may comprise three holes. The holes of the microphone grille 702 may allow the microphone 608 to receive audio data from the surrounding environment. The holes of the microphone grille 702 may provide ventilation for heat management. The positioning of the microphone grille 608 on the bottom portion of the base 506 as shown may be preferred when the light fixture 700 is located above an expected source of audio (e.g., above visitors at a front door). The location of the microphone grille 702 may be varied according to the design criteria of a particular implementation.

The IR sensor lens 704 may be used to detect motion. For example, one of the sensor modules 618a-618n of the sensor I/O block 616 may be the IR (or PIR) sensor (e.g., 618i). The IR sensor lens 704 may be used to facilitate detection by the IR sensor 618i. In some embodiments, information from the IR sensor 618i may be used to activate the lens module 530 (e.g., begin recording). In some embodiments, the IR sensor 618i may provide additional information to the lens module 530 to detect visitors. The sensitivity of the IR sensor 618i may be adjustable. For example, an interface may be provided to the user (e.g., a program, a web-based front end interface, a mobile application, etc.) to adjust the sensitivity of the lens module 530 and/or the IR sensor 618i.

The indicator LEDs 708a-708b may be used to provide basic information corresponding to an operating status of the light fixture 700. For example, the indicator LEDs 708a-708b may be configured to emit one or more colors. In one example, the indicator LEDs 708a-708b may emit one color (e.g., blue) when the light fixture 700 is in normal operation. In another example, the indicator LEDs 708a-708b may emit another color (e.g., red) when no wireless (e.g., Wi-Fi, Bluetooth, etc.) signal can be detected. In some embodiments, the indicator LEDs 708a-708b may be activated (e.g., emit light) when the light fixture is in operation. In some embodiments, the indicator LEDs 708a-708b may be deactivated when the light fixture 700 is in operation (e.g., a stealth mode of operation).

The adjustment grips 710a-710b may be configured to adjust a positioning of the lens module 530. For example, the adjustment grips 710a-710b may allow the user to manually move the lens module 530. In some embodiments, the adjustment grips 710a-710b may be configured to lock the lens module 530. For example, rotating the adjustment grips 710a-710b clockwise may lock the lens module 530 in place (e.g., prevent the lens module 530 from rotating). In another example, rotating the adjustment grips 710a-710b counterclockwise may unlock the lens module 530 and allow the user to manually aim the lens module 530.

The speaker grille 712 may be positioned above the lens module 530 on the base 506. The speaker grille 712 may be implemented as holes on the base 506. The holes of the speaker grille 712 may allow the speaker 670 (or the speaker 606) to emit audio data to the surrounding environment. For example, the speaker 670 may be implemented as a 45 mm music-quality speaker. The location of the speaker grille 712 may be varied according to the design criteria of a particular implementation.

Figure 26:
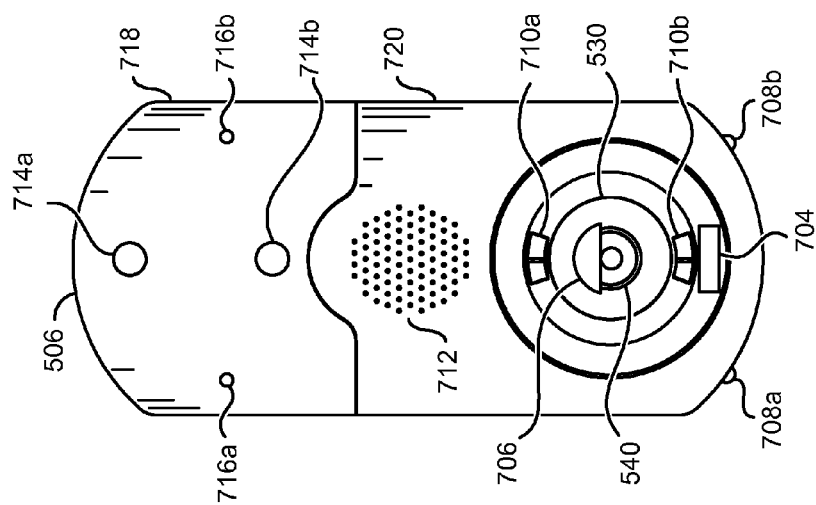
FIG. 26 is a diagram illustrating a front view of an exemplary embodiment of the invention without the light shade shown.

Referring to FIG. 26, a front view of the light fixture 700 is shown. The light shade 502 is not shown for clarity. In the front view of the light fixture 700 the lens module 530, the lens 540, the IR sensor 704, the lens cover 706, the indicator LEDs 708a-708b, the adjustment grips 710a-710b and the speaker grille 712 are shown on a bottom portion 720 of the base 506. A top portion 718 of the base 506 may comprise the light shade mounts 714a-714b and the light fixture mounts 716a-716b.

The light shade mounts 714a-714b may be configured to provide support for the light shade 502. The light shade mounts 714a-714b may provide a mounting point for the light shade 502. In some embodiments, the light shade mounts 714a-714b may be configured to allow the light shade 502 to be removed from the base 506 (e.g., allow different styles of light shades to be swapped in and out). In some embodiments, the light shade mounts 714a-714b may be configured to be fixed to the base 506 (e.g., riveted) to prevent removal of the light shade 502 and/or provide better support. One or more of the light shade mounts 714a-714b may provide a channel (e.g., an opening) for connecting wires from a rear side of the base 506 to the light bulb 102.

The light fixture mounts 716a-716b may be configured to provide support for the light fixture 700. The light fixture mounts 716a-716b may be openings to attach the base 506 to a wall via mounting screws. The mounting screws may extend from the wall and through the light fixture mounts 716a-716b. The light fixture mounts 716a-716b may be covered. For example, the light fixture mounts 716a-716b may be covered using decorative caps.

Figure 27:
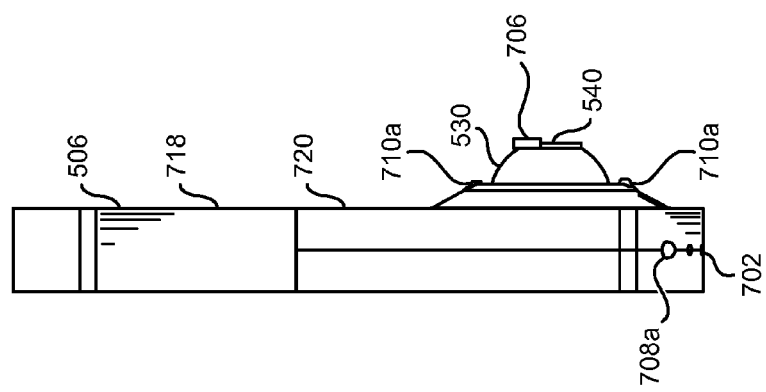
FIG. 27 is a diagram illustrating a side view of an exemplary embodiment of the invention without the light shade shown.

Referring to FIG. 27, a side view of the light fixture 700 is shown. The light shade 502 is not shown for clarity. In the side view, the lens module 530 is shown protruding and/or extending from the base 506. For example, half of the lens module 530 may be inside the base 506 and half of the lens module 530 may be exposed. Implementing the lens module 530 to extend from the base 506 may allow the lens module 530 to have a larger range of motion to aim the lens 540.

Figure 28:
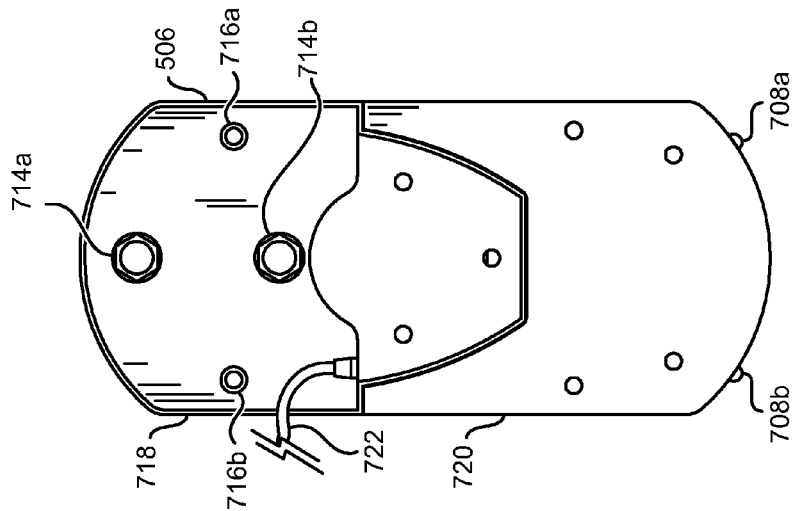
FIG. 28 is a diagram illustrating a rear view of an exemplary embodiment of the invention without the light shade shown.

Referring to FIG. 28, a rear view of the light fixture 700 is shown. The light shade 502 is not shown for clarity. A back side of the top portion 718 of the base 506 is shown exposed (e.g., has no cover). A back side of the bottom portion 720 of the base 506 is shown covered. The bottom portion 720 may be used to fully (or partially) enclose components of the light fixture 700 within the base 506. The cover of the bottom portion 720 of the base 720 may be held in place with fasteners (e.g., screws, rivets, clips, etc.).

A cable 722 is shown feeding into the bottom portion 720 of the base 506 from the top portion 718 of the base 506. The cable may comprise a number of wires (e.g., a hot wire, a neutral/return wire and/or a control wire). Feeding the cable 722 from the top portion 718 may allow the cable 722 to tuck into the open (e.g., hollow) top portion 718 to conceal the cable 722 when the light fixture 700 is mounted against a flat surface (e.g., a wall or ceiling). The cable 722 may provide an electrical connection to the lens module 530 and/or other components of the light fixture 700. For example, the cable 722 may connect to electrical wires from an electrical box (or junction box) and a power adapter in the light fixture 700. The power adapter may convert the external electrical supply (e.g., an AC source) to an electrical supply compatible with (e.g., a DC source, a low voltage source, etc.) the components of the light fixture 700 (e.g., the lens module 530 and/or any internal components). The cable 722 may further be connected to electrical wires used to connect to the light socket 110.

Referring to FIG. 29, internal components of the light fixture 700 are shown. The bottom portion 720 of the base 506 is shown separated into a front cover 720a and a back cover 720b. A portion (e.g., half) of the microphone grille 702a, the IR sensor lens 704, the adjustment grips 710a-710b and the speaker grille 712 are shown on the front cover 720a. A portion (e.g., half) of the microphone grille 702b, the indicator LEDs 708a-708b and the speaker 670 are shown on the back cover 720b.

The lens module 530 may be positioned to fit between (e.g., be held in place by) the front cover 720a and the back cover 720b. For example, the lens module 530 may be partially enclosed within the back cover 720b and partially exposed through the front cover 720a.

The processor module 580 is shown as an internal component of the light fixture 700. The processor module 580 is shown comprising two circuit boards (e.g., a circuit board 580a and a circuit board 580b). The components of each of the circuit boards 580a-580b may be varied according to the design criteria of a particular implementation. For example, the shape of the processor module 580 may be configured based on the shape (e.g., aesthetics) of the light fixture 700, the internal components implemented, heat dissipation factors, etc. For example, the shape of the processor module 580 may be configured to fit around the lens module 530.

The circuit board 580a is shown comprising the processor 602. The circuit board 580a is shown connected to the speaker 670. The circuit board 580b is shown connected to the indicator LEDs 708a-708b. The circuit board 580b is shown connected to the microphone 608. For example, the microphone 608 is connected to the circuit board 580b to provide a closer proximity to the bottom of the base 506 (e.g., to receive external audio signals). The circuit board 580b is shown connected to the IR sensor 618i. For example, the IR sensor 618i is connected to the circuit board 580b to line up with the IR sensor lens 704 on the bottom of the base 506.

The circuit board 580b is shown comprising a button 724. The button 724 may be a reset (or initialization) button. For example, the reset button 724 may be used to allow a user to configure the light fixture 700. The reset button 724 may be accessed via one of the holes of the microphone grille 702 and/or another opening on the base 506.

A power adapter 726 is shown as an internal component of the light fixture 700. The power adapter 726 is shown connected to the cable 722. The power adapter 726 may be configured to receive an external power source (e.g., an AC power source from the premises). The power adapter 726 may be configured to convert the external power source to a power source usable by the processor module 580 and/or the lens module 530 (e.g., a 5V DC source). The power adapter 726 may be configured for low audible noise (e.g., to prevent coupling with the microphone 608).

Referring to FIG. 30, a cut away view of internal components of the exemplary embodiment 700 is shown. The speaker 670 may be positioned to line up with the speaker grille 712. The speaker 670 may emit audio through the speaker grille 712.

The lens module 530 is shown comprising the camera module 100. The camera module 100 may capture video data from the surrounding environment through the lens 540. The video data captured by the camera module 100 may be presented to the processor module 580. The processor 602 may be configured to process the received video data captured by the camera module 100. The processor 602 may generate the control signals in response to the received video data.

Figure 31:
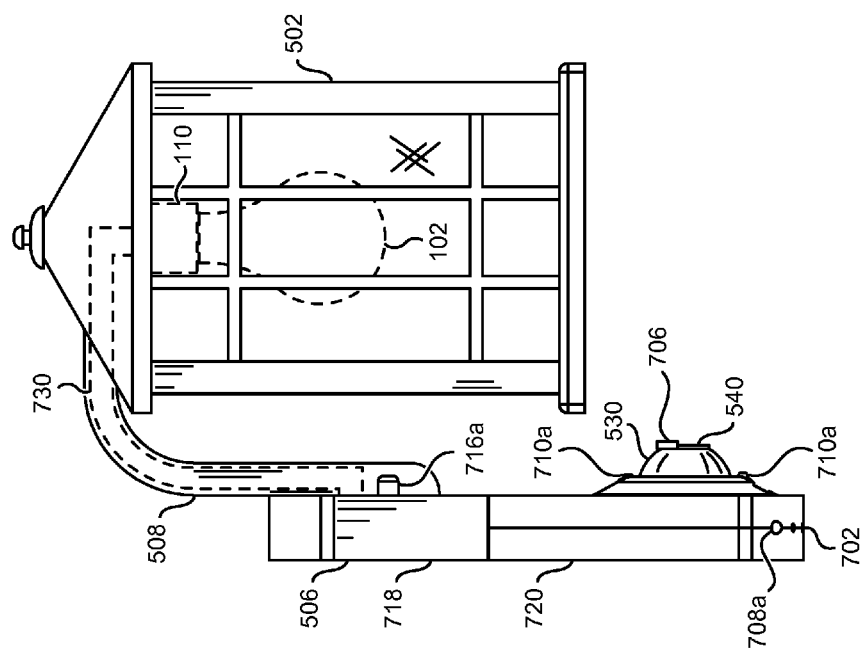
FIG. 31 is a diagram illustrating a side view of an exemplary embodiment of the invention with the light shade shown.

Referring to FIG. 31, a side view of the light fixture 700 is shown. The light fixture mounts 716a-716b are shown covered by decorative caps. The lens module 530 is shown in the bottom portion 720 of the base 506 below a level of the light shade 502. The attachment 508 is shown connected to the top portion 718 of the base 506.

The attachment 508 may be removably attached to the top portion 718 with the light shade mounts 714a-714b. In the side view shown, the attachment 508 may cover the light shade mounts 714a-714b. The attachment 508 may be attached to the light shade 502. The attachment 508 may be configured to have a hollow channel 730. The hollow channel 730 of the attachment 508 may provide space to feed wires from the back of the base 506, through the light shade mounts 714a-714b, through the attachment 508 and to the lamp shade 502. For example, the hollow channel 730 may provide space to allow a connection to the socket 110 of the light shade 502.

Figure 32:
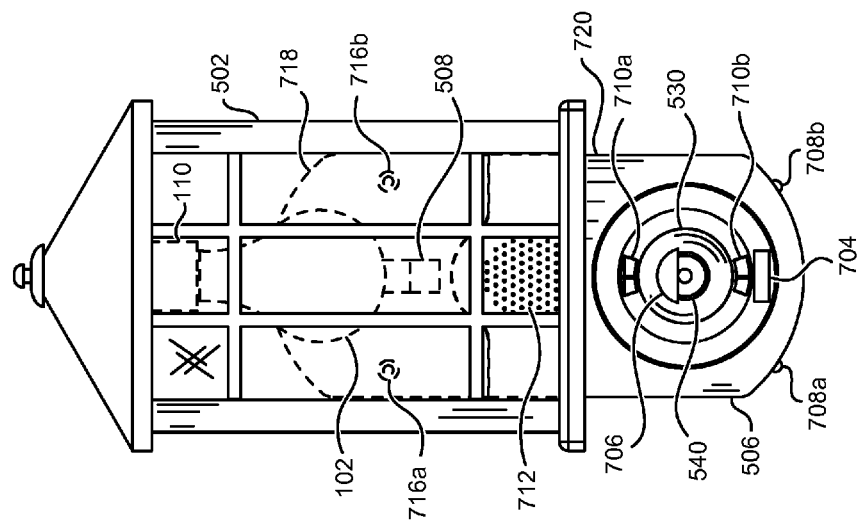
FIG. 32 is a diagram illustrating a front view of an exemplary embodiment of the invention with the light shade shown.

Referring to FIG. 32, a front view of the light fixture 700 is shown. The lens module 530 is shown in the bottom portion 720 of the base 506 that extends below the light shade 502. The lens 530 is shown not being obstructed by the light shade 502. The light shade 502 may obstruct (or block) the top portion 718 of the base 506. The light shade 502 may partially obstruct (or block) the bottom portion 720 of the base 506.

Figure 33:
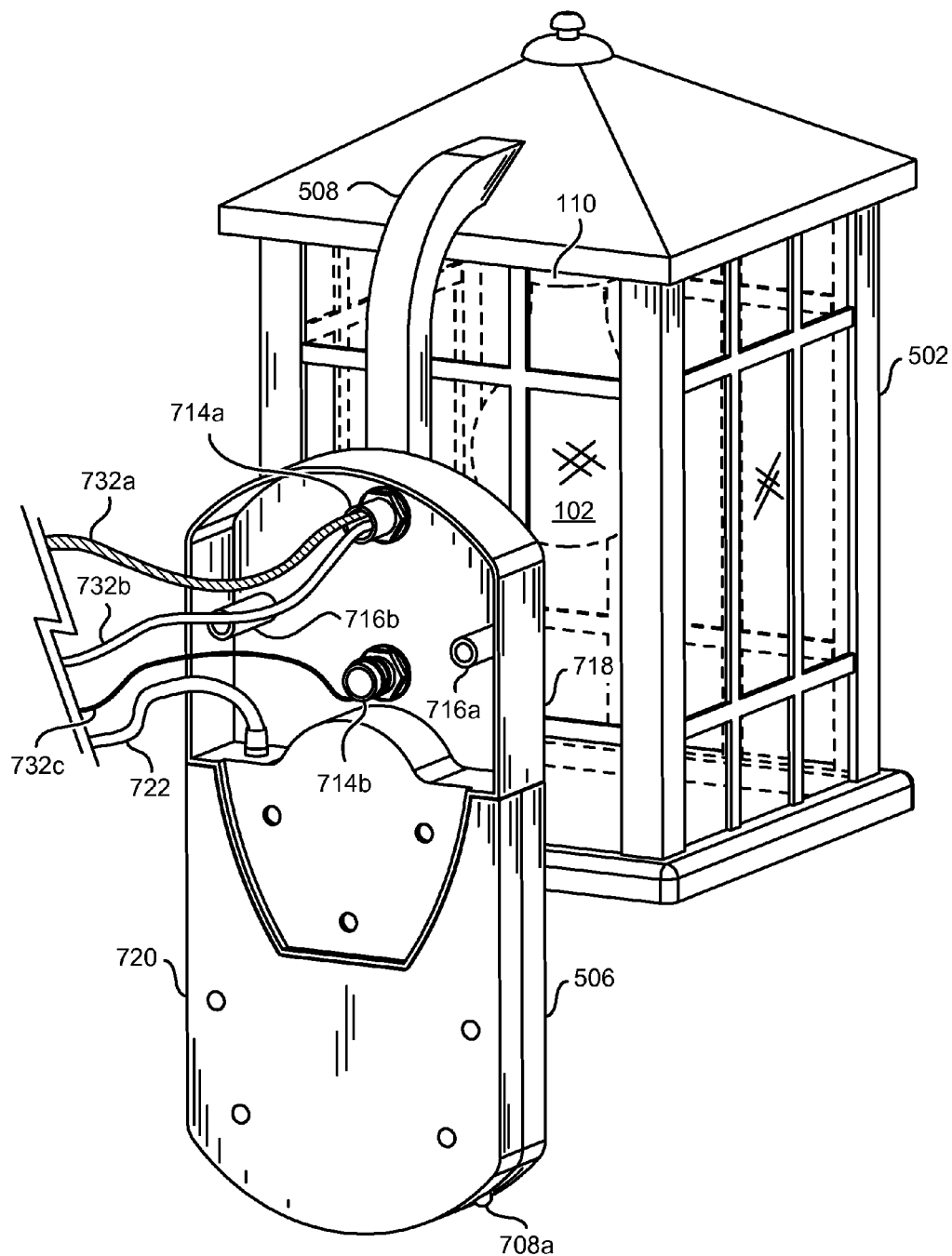
FIG. 33 is a diagram illustrating a rear view of an exemplary embodiment of the invention with the light shade shown.

Referring to FIG. 33, a rear view of the light fixture 700 is shown. The top portion 718 is shown exposed and hollow. The light shade mounts 714a-714b and the light fixture mounts 716a-716b are shown within the top portion 718. The light shade mounts 714a-714b and/or the light fixture mounts 716a-716b may not extend past the base 506 (e.g., to allow the base 506 to sit flush against a flat surface).

Wires 732a-732c are shown extending from the light shade mounts 716a-716b. In the example shown, the hot wire 732a and the neutral (e.g., return) wire 732b are shown extending from the light shade mount 714a and the ground wire 732c is shown extending from the light shade mount 714b. The wires 732a-732c may connect to supply electrical wires (e.g., from an electrical box and/or junction box to connect to a power source on the premises) and/or the cable 722. The wires 732a-732c may be tucked within the hollow top portion 718. Tucking the wires 732a-732c within the top portion 718 may hide the wires 732a-732c from view when the light fixture 700 is mounted. The wires 732a-732c may be fed through one or more of the light shade mounts 714a-714b to the hollow channel 730 in the attachment 508. Via the hollow channel 730 in the attachment 508, the wires 732a-732c may connect to the light socket 110 to power the light bulb 102.

The cable 722 may connect to the same supply electrical wires as the wires 732a-732c. For example, the wires 732a-732c may connect the light socket 110 to the power source on the premises (e.g., an AC source such as a 120V, 60 Hz source, a 230V, 50 Hz source and/or any other source) to power the light bulb 102. The cable 722 may connect the power adapter 726 to the power source on the premises. For example, the wires in the cable 722 may connect to corresponding wires 732a-732c. For example, the hot wire from the cable 722 may connect to one of the wires 732a-732c. In another example, the control wire from the cable 722 may connect to one of the wires 732a-732c. For example, the control wire from the cable 722 may present the control signal from the processor 602 (e.g., via the power adapter 726), to the light bulb 102 (e.g., to control the light bulb 102). The configuration of the wires 732a-732c and/or the cable 722 may be varied according to the design criteria of a particular implementation. The cable 722 and/or the wires 732a-732c may allow easy installation of the light fixture 700 in a small amount of time (e.g., less than 15 minutes).

Figure 34:
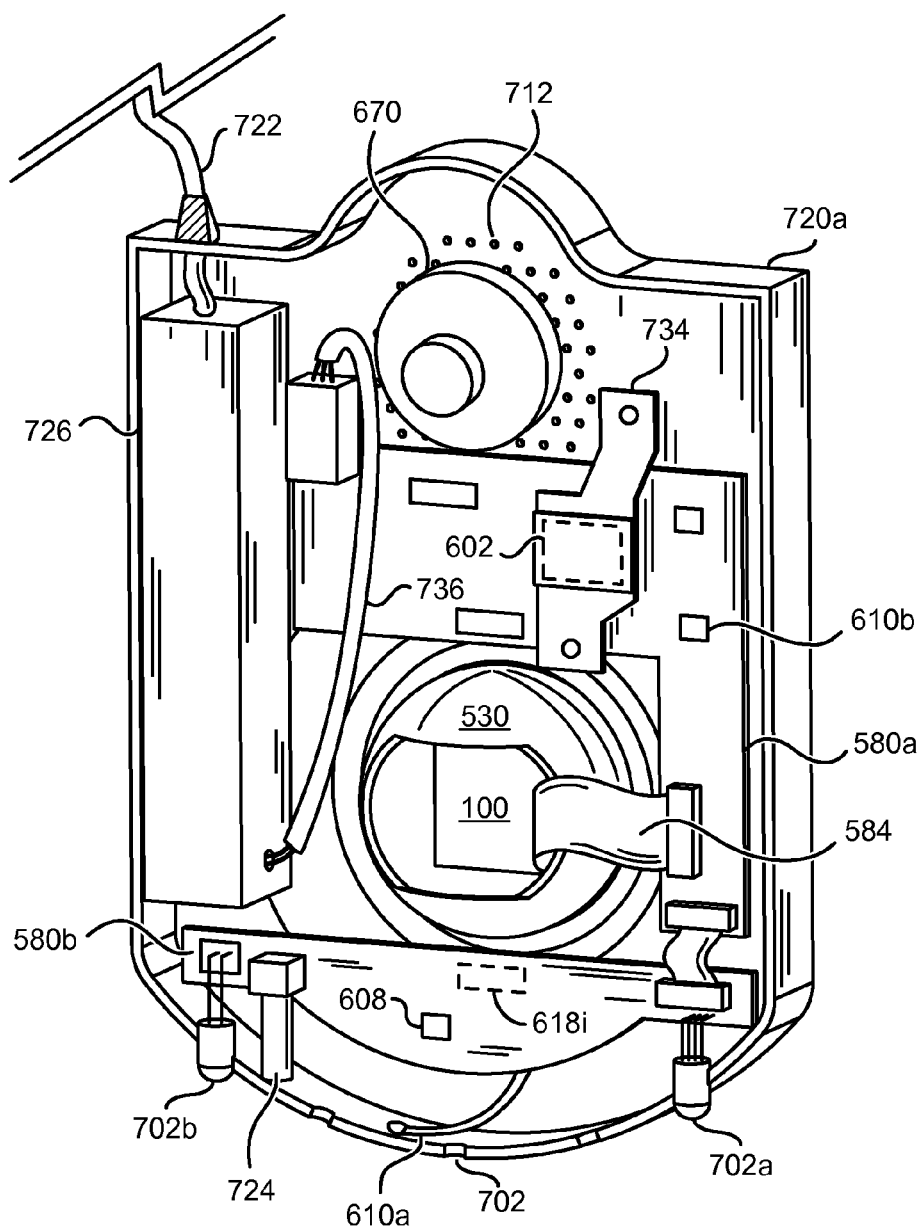
FIG. 34 is a diagram illustrating a rear view of the internal components of an exemplary embodiment of the invention.

Referring to FIG. 34, a rear view of the internal components of the light fixture in the bottom portion 720a of the base 506 is shown. The processor module 580, the lens module 530 and the power adapter 726 are shown. The speaker 670 is shown connected to the circuit board 580a. The lens module 530 is shown connected to the processor module 580. The power adapter 726 is shown connected to the processor module 580.

The circuit board 580a is shown as an L-shape (e.g., configured to fit around the lens module 530). The circuit board 580a is shown comprising the processor 602 and the communication module 610b. The processor 602 is shown under a heatsink 734. For example, the communication module 610b may be a Wi-Fi circuit. The communication module 610b may be connected to an antenna 610a. For example, the antenna 610a may be a flexible Wi-Fi antenna. The Wi-Fi antenna 610a may be held in place (e.g., glued) to a bottom of the base 506. The circuit board 580a may comprise other internal components of the light fixture 700. For example, the circuit board 580a may comprise a Bluetooth antenna (e.g., a Bluetooth antenna may be positioned on the other side of the circuit board 580a).

The lens module 530 is shown having an opening. The opening may allow the cable 584 to connect the camera sensor 100 to the circuit board 580a. The cable 584 may be configured to transmit the video data captured by the camera sensor 100. For example, the cable 584 may be a high-speed, low-noise flexible cable. The circuit board 580a may transmit the video data from the cable 584 to the processor 602.

The circuit board 580b is shown connected to the circuit board 580a. The circuit board 580b is shown connected to the microphone 608, the IR sensor 618i, the indicator LEDs 708a-708b and the reset button 724. The arrangement of the components and/or the type of components of the circuit board 580b may be varied according to the design criteria of a particular implementation.

A cable 736 is shown connecting the power adapter 726 to the processor module 580. The cable 736 may transmit supply power converted by the power adapter 726 to the processor module 580 (and the lens module 530). The cable 736 may transmit the control signals from the processor 602 to the power supply 726. For example, the cable 736 may transmit DC signals between the power supply 726 and the processor module 580. The power adapter 726 may convert the control signals from the processor 602 to be compatible with the light bulb 102 and/or other external devices. For example, the power adapter 726 may convert external power received from the cable 722 to provide power to the processor module 580 via the cable 736. In another example, the power adapter 726 may convert signals received from the processor module 580 via the cable 736 to provide power to external devices via the cable 722. The light fixture 700 may be configured to be weatherproof. The light fixture 700 may be installed at indoor and/or outdoor locations. For example, the light fixture 700 may be waterproof and/or water resistant. The light fixture 700 may be configured to operate in direct sunlight, cold climates and warm climates. For example, the light fixture 700 may operate in temperatures ranging from −40 F to 131 F. The light fixture 700 may have an ingress protection marking and/or an international protection marking rating of IP44. For example, the light fixture 700 may be effectively protected against water splashing against the base 506 from any direction and/or protected against objects (e.g., wires, screws, etc.) greater than 1 mm in size.

The communication module 610 may be configured to connect to a local network and/or a wide area network (e.g., the internet). In some embodiments, the communication module 610 may be configured to implement one or more types of communications protocols. For example, the communication module 610 may support a Wi-Fi connection and/or a Bluetooth connection. In some embodiments, the communication module 610 may be distributed as multiple circuits on the processor module 580 (e.g., a processing chip for each communications protocol). Other types of communications protocols may be implemented according to the design criteria of a particular implementation. In some embodiments, the communication module 610 may implement the Bluetooth connection to connect to a user device (e.g., a smartphone) to provide an interface for configuring the light fixture 700 (e.g., to allow the user to input local network settings). In some embodiments, the communication module 610 may implement the Wi-Fi connection to connect to a cloud service via the internet.

In some embodiments, the light fixture 700 may be configured to upload data (e.g., the captured video data) to the cloud service. For example, the data uploaded to the cloud service may be streamed to the user device. The user device may connect to the cloud service to allow the user to request the stored video data. For example, the video data may be sent to the user device as a live (or nearly live) video stream. The data traffic to/from the cloud services may be encrypted (e.g., AES 128-bit encryption, AES 256-bit encryption, etc.). User account passwords may be salted and hashed with a cryptographic hash function.

In some embodiments, the light fixture 700 may store the captured video data (e.g., in the memory 604). In some embodiments, the video data may be uploaded to the cloud service. Generally, the cloud service and/or the memory 604 may have a limited storage capacity. In some embodiments, the light fixture 700 may analyze the captured video data (e.g., using the processor 602) and/or data from the IR sensor to perform a particular type of detection. For example, the light fixture 700 may detect objects, motion and/or visitors within 3 meters (e.g., 10 feet). The light fixture 700 may initiate storage of the video data in response to the particular type of detection. The detection performed by the light fixture 700 may be used to detect objects approaching the premises.

For example, the light fixture 700 may initiate storage of the video data in response to motion detection. The user device may be used to allow a user to set a motion threshold for the light fixture 700. For example, a lower motion threshold may be more sensitive to motion. In another example, a higher motion threshold may be less sensitive to motion (e.g., reduce a number of false positives). The motion threshold may be adjustable.

In some embodiments, the light fixture 700 may initiate storage of the video data in response to detecting and/or locating a person and/or other type of object in the video data. For example, the light fixture 700 may analyze the video data to detect people and/or animals. In some embodiments, facial recognition may be implemented to identify and/or recognize visitors. In some embodiments, the video data may be analyzed to determine a behavior of the visitors.

The light fixture 700 may implement machine learning techniques to improve detection accuracy of visitors and/or objects. For example, the user may be able to provide a correct and/or incorrect label to a detection performed by the light fixture 700. If the detection is incorrect, the incorrect label may be used by the light fixture 700 to incorporate an incorrect result of the detection into the machine learning techniques. In some embodiments, the machine learning techniques may be implemented in the cloud service (e.g., the analysis is performed using cloud computing resources). Video data and/or correct/incorrect labels may be uploaded and/or stored anonymously (e.g., without personal identification information). The light fixture 700 may be configured to ignore (e.g., not respond to, not track and/or not send notifications in response to) small animals and/or shadows.

In some embodiments, the light fixture 700 may be configured to send notifications to the user device in response to the detection. For example, a text message and/or an email may be transmitted in response to the notification. In another example, a notification may be sent via an API (e.g., push notifications) for a particular operating system (e.g., Android notifications, IOS notifications, Windows notifications, etc.). Generally, the user may create a user account (e.g., comprising at least an email address and a password as credentials) for the cloud service (e.g., via an app and/or a web-based interface). The user account may allow the user to configure preferences. The preferences may comprise the notification settings. The type of notifications sent by the light fixture 700 may be based on the notification settings.

In some embodiments, the notifications may be sent in response to the Wi-Fi signal. For example, the cloud services may detect that the light fixture 700 is no longer connected. The cloud services may send the notification to the user device indicating that the Wi-Fi connection was lost and/or disconnected. The communication module 610 may be configured to re-connect to the cloud services when the Wi-Fi connection is established.

The cloud service may store portions of the video data. For example, portions of the video data may be saved in response to the particular types of detections. The portions of video data may be video clips. The video clips may be encoded and/or compressed to reduce a size of storage capacity of the video clips. The video clips may have a limited video length (e.g., 30 seconds, one minute, 90 seconds, five minutes, etc.). The length of the video clips may be based on the configuration preferences and/or in response to the detections by the light fixture 700 (e.g., a longer video clip may result in response to continuous detections). In some embodiments, the video clips may be pre-padded and/or post-padded with video data before and/or after the detection. For example, the video clip may store video data from a pre-determined time before and/or after the detection (e.g., 30 seconds before the detection and/or 30 seconds after the detection for a video clip approximately one minute long).

In some embodiments, a user interface may be provided for the user device (e.g., an app, an executable program, a web-based interface, etc.). The user interface may allow one or more user devices to control various components of the light fixture 700. For example, one or more user devices may be configured to access the user account. The control signals may be generated in response to the input from the user devices. For example, an icon may be provided on the user interface representing a light bulb. The user may activate and/or deactivate the light bulb 102 by pressing (touching on a touchscreen, clicking, etc.) the icon.

Other external components may be turned on and/or off from the user interface. For example, icons may be provided to allow the user to control the speaker 670. In one example, the speaker 670 may playback a pre-recorded audio message (e.g., the user may select from one or more pre-recorded audio messages on the user interface). In another example, the speaker 670 may sound an alarm (e.g., one or more alarm types may be selected from the user interface).

In some embodiments, the light fixture 700 may be configured for two-way audio communications (e.g., an intercom). For example, a visitor may speak through the microphone 608. The microphone 608 may receive the audio data. The communication module 610 may transmit the received audio to the user device. The user device may playback the audio to the user. The user may speak via the user device. The user device may transmit the audio to the light fixture 700 via the communication module 610 (e.g., a Wi-Fi connection). The speaker 670 may transmit and/or stream the received audio.

The detection, the pre-recorded audio, the video streaming and/or the two-way audio communication may allow the user to observe the surrounding environment of the light fixture 700 from anywhere and at any time. For example, the light fixture 700 may be used to deter a burglar when a family is away from home (e.g., on vacation). In another example, the light fixture 700 may alert the user of a package being delivered to the home and the user may provide instructions to the delivery person.

In some embodiments, the user interface may be used to input a schedule. The control signals may be generated in response to the schedule. For example, the schedule may indicate times and/or dates to activate and/or deactivate the light bulb 102 (e.g., a dusk-to-dawn mode). In some embodiments, the control signals may be generated in response to the schedule and a random value. For example, the schedule may be configured to turn on the light bulb 102 at 8 pm, and the random value may add or subtract a maximum value of 5 minutes to the scheduled time to allow the light bulb 102 to be activated at any time between 7:55 pm and 8:05 pm. The random value may be implemented to provide the appearance that the light bulb 102 is being controlled by a person instead of a schedule. The schedule may be customizable via the user interface (e.g., different patterns on weekdays and weekends).

The light fixture 700 may provide various APIs (application programming interface) to connect with other devices (e.g., other home automation devices). For example, the APIs may allow various other devices to communicate with the light fixture 700. The light fixture 700 may generate control signals based on the communication with the various devices other devices. The types of APIs available may be varied according to the design criteria of a particular implementation.

The user interface may provide various information to the user. For example, the user interface may indicate a signal strength (e.g., Wi-Fi and/or Bluetooth signal strength), provide Wi-Fi setup, allow each of the light fixtures 700 to be named, allow the user to enable/disable and/or customize alerts/notifications, and/or rename, save, share and/or download particular video clips, etc. The user interface may allow the user to control one or more of the light fixtures 700.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a shade;
an attachment device comprising a hollow channel;
a camera sensor configured to capture video data of a surrounding environment of said apparatus; and
a base configured to enclose a circuit, said circuit configured to provide (i) an electrical connection to (a) said camera sensor and (b) components of said circuit, (ii) a connection between a power source and an external device, and (iii) control signals for activation of (a) said external device and (b) said components of said circuit, wherein (A) said circuit comprises an antenna module configured to connect and send data to a network through a wireless connection, (B) said video data is sent as said data through said wireless connection, (C) said camera sensor is positioned in a bottom part of said base that extends below said shade, (D) said attachment device is configured to connect said base to said shade and (E) said hollow channel is configured to provide a space to feed wires through said base to said shade.

2. The apparatus according to claim 1, wherein said data is uploaded to a cloud service.

3. The apparatus according to claim 1, wherein said apparatus is configured to (i) perform a detection and (ii) store said video data in response to said detection.

4. The apparatus according to claim 3, wherein (i) said detection comprises a motion threshold and (ii) said motion threshold is adjustable.

5. The apparatus according to claim 3, wherein said detection comprises locating a person in said video data.

6. The apparatus according to claim 3, wherein (i) said video data is stored as video clips in response to said detection and (ii) said video clips comprise said video data (a) corresponding to said detection, (b) from a pre-determined amount of time before said detection and (c) from a pre-determined amount of time after said detection.

7. The apparatus according to claim 3, wherein said apparatus is further configured to send notifications to a user device in response to said detection.

8. The apparatus according to claim 1, wherein said video data is sent as a live video stream to a user device.

9. The apparatus according to claim 1, wherein (i) said antenna module is further configured to connect to one or more user devices and (ii) said control signals are generated in response to input from said user devices.

10. The apparatus according to claim 9, wherein (i) said external device is a light bulb and (ii) said control signals are configured to turn said light bulb on and off.

11. The apparatus according to claim 9, wherein (i) one of said components of said circuit is a speaker and (ii) said control signals are configured to play at least one of (a) pre-recorded audio from said speaker and (b) an alarm from said speaker.

12. The apparatus according to claim 9, wherein (i) one of said components of said circuit is a speaker, (ii) said antenna module is further configured to send/receive audio signals and (iii) said control signals are configured to stream said audio signals to said speaker.

13. The apparatus according to claim 1, wherein said control signals are generated in response to a schedule.

14. The apparatus according to claim 1, wherein (i) said camera sensor is in a lens module and (ii) said lens module is configured having a spherical shape.

15. The apparatus according to claim 14, wherein (i) said lens module further comprises a lens and a lens cover and (ii) said lens cover is configured to prevent glare caused by said external device.

16. The apparatus according to claim 14, wherein said lens module is configured to be waterproof and provide heat dissipation.

17. The apparatus according to claim 1, wherein (i) said circuit further comprises a power adapter and (ii) said power adapter is configured to convert power from said power source for said components of said circuit.

18. The apparatus according to claim 17, wherein said power adapter is further configured to convert said control signals from said circuit for said external device.

19. The apparatus according to claim 1, wherein said circuit is connected to said camera sensor with a high-speed, low noise, flexible cable.

* * * * *